(12) United States Patent
Matsumoto

(10) Patent No.: US 7,155,520 B2
(45) Date of Patent: Dec. 26, 2006

(54) SPEECH COMMUNICATION SERVICE PROVIDING SYSTEM

(75) Inventor: Takashi Matsumoto, Tokyo (JP)

(73) Assignee: Fujitsu Limited, Kawasaki (JP)

( * ) Notice: Subject to any disclaimer, the term of this patent is extended or adjusted under 35 U.S.C. 154(b) by 605 days.

(21) Appl. No.: 09/918,280

(22) Filed: Jul. 30, 2001

(65) Prior Publication Data
US 2002/0133599 A1    Sep. 19, 2002

(30) Foreign Application Priority Data
Mar. 15, 2001    (JP)    ............................. 2001-074475

(51) Int. Cl.
G06F 15/16    (2006.01)
H04M 7/00    (2006.01)

(52) U.S. Cl. ...................... 709/227; 379/219

(58) Field of Classification Search ........ 709/227–229, 709/225, 232, 223; 370/352, 389, 356; 455/417; 379/67, 219, 201.01
See application file for complete search history.

(56) References Cited

U.S. PATENT DOCUMENTS

| 6,205,139 | B1* | 3/2001 | Voit ............................ 370/389 |
| 6,421,536 | B1* | 7/2002 | Uranaka et al. ............. 455/417 |
| 6,539,077 | B1* | 3/2003 | Ranalli et al. .............. 379/67.1 |
| 6,571,290 | B1* | 5/2003 | Selgas et al. ................ 709/228 |
| 6,584,095 | B1* | 6/2003 | Jacobi et al. ................ 370/352 |
| 6,697,478 | B1* | 2/2004 | Meldrum et al. ....... 379/211.04 |
| 6,744,860 | B1* | 6/2004 | Schrage .................... 379/88.03 |
| 6,791,974 | B1* | 9/2004 | Greenberg ................... 370/352 |
| 6,798,771 | B1* | 9/2004 | Low et al. ................... 370/353 |
| 6,853,621 | B1* | 2/2005 | Spear et al. ................. 370/238 |
| 6,879,678 | B1* | 4/2005 | Lang ........................... 379/219 |
| 6,973,091 | B1* | 12/2005 | Hester ......................... 370/401 |
| 2004/0213391 | A1* | 10/2004 | Yau et al. ............... 379/114.01 |

FOREIGN PATENT DOCUMENTS

JP    08172495    7/1996
JP    2000151811    5/2000

OTHER PUBLICATIONS

Hyllander et al, Communication System Including Means For Transmitting Internet Address via SMS, Mar. 11, 1999, WIPO, WO 99/12365, 32 pages.*
Mullender; Distributed System Second Edition; 1993.*

* cited by examiner

Primary Examiner—Glenton B. Burgess
Assistant Examiner—Sean Reilly
(74) Attorney, Agent, or Firm—Katten Muchin Rosenman LLP

(57) ABSTRACT

A telephone, when dialing another telephone, gives first address information of another telephone to a server, and obtains call identifying information corresponding to the first address information and second address information as a dial number of a control unit from the server. The telephone gives the control unit a call containing the call identifying information based on the second address information. The control unit obtains the first address information corresponding to the call identifying information from the server, and allows the call from the telephone to arrive at another telephone corresponding to the first address information.

22 Claims, 16 Drawing Sheets

LOG-IN SCREEN

TELEPHONE NUMBER & AREA INFORMATION INPUT SCREEN

CALL ORIGINATING SCREEN

SPEECH COMMUNICATION SERVICE PROVIDING SYSTEM

BACKGROUND OF THE INVENTION

1. Field of the Invention

The present invention relates to a system for providing a service for speaking by use of a terminal device implementing a function of connecting to the Internet.

2. Description of the Related Art

An explosive spread of cellular (or portable) phones and PHS (Personal Handy-phone System) (which are generically called [mobile telephones]) could be seen over the recent years in Japan, and now the majority of people have the mobile telephones. Under this circumstance, a scheme of providing the mobile telephones with much higher functions is being accelerated, and, with the spread of the Internet, there appear mobile telephones each implementing (an Internet connecting function) an E-mail delivering/receiving function and a simple Web browser as well. This type of mobile telephone as a single unit is capable of connecting to the Internet, and therefore a user thereof is able to deliver and receive an E-mail and to browse a Web site by use of this mobile telephone.

This is followed by a more active scene in the businesses utilizing the mobile telephones each implementing the Internet connecting function. This derives from the following reasons:

(i) If accessible via the mobile telephone to the Web site as an advertisement medium, it follows that the advertisement is browsed irrespective of where the user is.

(ii) A service enterprise (company) for a mobile telephone service provides a Web-based service provider with a service for collecting, as an agent, service fees from the users. Therefore, the service provider can easily open a variety of Web-based and charged-fee information providing services and Internet shopping sites etc.

On the other hand, a charge for the speech communication (call) of the mobile telephone becomes cheaper and cheaper year by year owing to competitions between the mobile telephone companies but is still higher than a speech communication of a fixed type telephone. There is a high need for being able to have a call with a cheaper fee. Hence, for example, a service in which the service provider discounts the speech communication charge on condition that the user is to browse an advertisement or a more economical telephone service utilizing a private telephone network, is known effective in terms of the speech communication charge.

A prior art for providing the telephone service (which will hereinafter be called a [purpose-oriented service]) in which the service provider is burdened with or discounts the speech communication charge, is categorized into a technology (a first prior art) making use of a called party charge telephone number and a technology (a second prior art) making use of a callback.

(1) First prior art

Normally, a caller is charged a fee for the speech communication. By contrast, one of the common carriers provides a service in which when giving a speech communication by use of a specified telephone number, a charge is imposed on a called party. For example, a telephone number starting with "0120" used by NTT is known as a free dial, and a charge for the speech communication using the free dial is imposed on the called party. If a system as shown in FIG. 15 is configured by utilizing the called party charge telephone number typified by the free dial described above, the purpose-oriented service can be provided.

Referring to FIG. 15, the service provider installs a telephone control unit connected via two telephone lines to the common carrier. One (a telephone number 1) of the two telephone lines is defined as a called party charge telephone number, and this telephone number is disclosed to the service users. The system illustrated in FIG. 15 operates as follows:

1) A user of a telephone A1, when giving a call to a telephone B1 (a telephone number 12), at first dials a telephone number 11.

2) The telephone control unit automatically answers and connects a PB (Push Button) receiver provided in the telephone control unit to the line.

3) The user of the telephone A1 transmits a user's ID and password (PW) by PB signals.

4) The telephone control unit checks the user's ID and PW.

5) The use of the telephone A1 transmits a telephone number 12 by the PB signals.

6) The telephone control unit, upon receiving the telephone number 12, catches other telephone line and originates call to the telephone B1 with the telephone number 12.

7) The telephone B1 makes a ringing, and, when the user of the telephone B1 answers, a response signal is transmitted back to the telephone control unit.

8) The telephone control unit, when receiving the response signal, sets the telephone A1 and the telephone B1 in a speech communication state.

Note that the user's ID and PW are transmitted as the PB signals in the example given above. If a message received contains a caller number, a telephone number of the telephone capable of utilizing the service is registered beforehand in the telephone control unit, and the telephone control unit checks the caller number when receiving the call, thereby making it possible to omit the transmission of the user's ID and PW by the PB signals.

In the operation 1) described above, the user of the telephone A1 dials the telephone number 11 defined as the called party charge telephone number. Therefore, the charge for the speech communication between the telephone A1 and the telephone control unit is imposed on the service provider installing the telephone control unit. Further, if the telephone number 12 is not a called party charge telephone number, a charge for a speech communication between the telephone control unit and the telephone B1 is also imposed on the service provider. Hence, the user of the telephone A1 is able to speak to the user of the telephone B1 without being burdened with the speech communication charge. If providing such a service that the service provider is burdened with a part of the speech communication charge, a system is configured, wherein an amount of money gained by subtracting the fees imposed on the service provider from a total sum of the charges for the speech communications between the telephone A1 and the telephone control unit and the charges for the speech communications between the telephone control unit and the telephone B1, is accumulated in a database per user's ID, and the settlement is made later on.

(2) Second Prior art

There is a method using the callback instead of making use of the called party charge telephone number. As described in the first prior art, though possible of taking the PB signal based architecture, if the telephone a implements the Internet connecting function, an Internet based architecture can also be taken. FIG. 16I a diagram showing an example of a system architecture utilizing the Internet for actualizing the method using the callback.

Referring to FIG. 16, the service provider prepares the telephone control unit and a server device connected to the Internet, and the telephone control unit can be controlled from the server device. In the example shown in FIG. 16, the server device has a function as a web server, the telephone A is capable of accessing the server device on the basis of HTTP (HyperText Transfer Protocol).

The system illustrated in FIG. 16 operates as follows:

1) The user of the telephone A2, when trying to give a call to the telephone B2 (a telephone number 22), at first accesses, based on HTTP, the server device installed by the service provider.

2) The server device transmits a log-in screen to the telephone A2.

3) The user of the telephone A2 sends a user's ID and PW to the telephone A2.

4) The server device checks the user's ID and PW, and, if a result is "OK", transmits a telephone number input screen to the telephone A2.

5) The user of the telephone A2 transmits the telephone number 22 and a telephone number 23 as a telephone number of the telephone A2 to the server device.

6) The server device transmits an accept confirmation screen to the telephone A2.

7) The telephone A2 disconnects from the server device.

8) The server device controls the telephone control unit and dials the telephone number 23.

9) The telephone A2 makes a ringing and, when the user of the telephone A2 answers, a response signal is transmitted to the telephone control unit.

10) When the telephone control unit receives the response signal, the server device controls the telephone control unit and originates a call to the telephone B2 with a telephone number 22.

11) The telephone B2 makes a ringing and, when the user of the telephone B2 answers, a response signal is transmitted to the telephone control unit.

12) When the telephone control unit receives the response signal, the server device controls the telephone control unit and sets the telephone A2 and the telephone B2 in the call state.

In this example, the telephone control unit gives the calls to the telephones A2 and B2. Therefore, the service provider installing the telephone control unit is burdened with both of the charge for the speech communication between the telephone control unit and the telephone A2 and the charge for the speech communication between the telephone control unit and the telephone B2. In the case of providing a service in which some proportion of the speech communication charge is imposed on the service provider, as in the example of the first prior art, there is configured the system wherein the fee the user of the telephone A2 is claimed to pay is accumulated in the database per user's ID, and the settlement is made later on.

Further, in this example, the user's ID and PW, the telephone number 22 and the telephone number 23 are transmitted via the Internet to the server device installed by the service provider. Therefore, the service provider enables the user of the telephone A to easily browse the advertisement displayed on a Web page. For instance, if the log-in screen described in the operation 2) and the telephone number input screen described in the operation 4) contain advertisements, the user of the telephone A2 inevitably browses the advertisements when inputting the data. This makes it feasible to easily actualize such a service that the speech communication charge is discounted on condition that the user is to browse the advertisement.

Moreover, in the case of inputting the user's ID and PW in the operation 3) and inputting the telephone numbers 22 and 23 in the operation 5), the user of the telephone A2 inputs while watching the screen and, after confirming on the screen that the data inputted are correct, operates the telephone A2 to transmit the inputted data to the server device. It is therefore possible to obtain a higher operability than in the case of inputting the data by the PB signals and to restrain a transmission of erroneous data due to an input mistake.

There arise, however, the following problems inherent in the first prior art shown in FIG. 15.

If the user's ID and PW transmitted as the PB signals are invalid, even when the connection to the telephone B1 gets uncompleted as in the case of the telephone number 12 being busy in line, the charge for the speech communication between the telephone A1 and the telephone control unit is required, and hence this is uneconomical to the service provider.

The service provider installs a plurality of telephone control units, and the called party charge telephone number (the telephone numbers 11) is different in each telephone control unit. In this case, if the telephone A1 is a fixed type telephone, only one telephone number of the telephone control unit closest thereto may be announced. By contrast, if the telephone A1 is classified as a mobile telephone, the closest telephone control unit may differ depending on where the telephone A1 exists. It is, however, difficult to have a plurality of telephone number announced by the service user and the telephone control units separately used depending on the location of the telephone.

The transmission of the user's ID and PW and the telephone number 12 by the PB signals involves a key operation of the telephone by the user, and the operability thereof declines. Further, if the number of digits to be inputted increases, a probability of causing an input mistake might rise.

Even when the telephone A1 has the Internet connecting function, if the architecture is as shown in FIG. 15, only the telephone function is used, and hence this does not suit the service in which the speech communication charge is discounted on condition that the user is to browse the advertisement.

Moreover, the second prior art has problems that follow.

In the example illustrated in FIG. 16, the telephone control unit at first performs dialing to the telephone A2 (the telephone number 23) and, when receiving the response signal from the telephone A2 gives the call to the telephone B2 (the telephone number 22). Therefore, even if the line of the telephone B2 is busy or if there is no answer, the charge for the speech communication between the telephone control unit and the telephone A2 occurs (see FIG. 17). This is uneconomical to the service provider.

In view of the problems described above, if schemed to originate a call to the telephone B2 before the telephone control unit receives the response signal from the telephone A2, there arises a case where the telephone A2 is busy in line or being called though the telephone B2 answers. In this case, when the user of the telephone B2 picks up the receiver upon a ringing of the telephone B2, the user hears an on-talk tone or a calling tone (see FIG. 18). This can not be allowed for the general telephone service. Accordingly, an inevitable operation is that the telephone control unit calls the telephone A2 ahead and, after receiving a response from the telephone A2, calls the telephone B2.

SUMMARY OF THE INVENTION

It is a primary object of the present invention to provide a call service providing system capable of restraining an occurrence of a call charge for providing a call service or restraining an amount of the call charge.

To accomplish the above object, according to one aspect of the present invention, a speech communication service providing system comprises: a server connected to the Internet; and a call control unit of speech communications. The server includes: (A) a module of generating, when receiving a piece of first address information as a piece of address information of a destination of a speech communication from a terminal device, a piece of call identifying information corresponding to the first address information; (B) a module of storing the call identifying information and the first address information; (C) a module of notifying the terminal device of the call identifying information and second address information as a piece of address information of the control unit; and (D) a module of notifying, when receiving the call identifying information from the control unit, if the same call identifying information is stored in the storing module, the control unit of the first address information corresponding thereto. The control unit includes: (a) a module of inquiring of, when receives a call including a call identifying information from the terminal device, the terminal device transmitting the call using the second address information received from the server, the server about the first address information corresponding to the call identifying information included in the call; and (b) a module of performing, when receiving the corresponding first address from the server, processes in order that the call from the terminal device arrives at another terminal device corresponding to the first address information.

According to the present invention, the terminal device receives the call identifying information from the server, gives the call identifying information to the control unit. The control unit obtains the first address information corresponding to the call identifying information, and executes a connection process based on this piece of first address information. The user of the terminal device is thereby unable to make the control unit execute a process of allowing the call to arrive at the telephone (telephone number) of the destination terminal. Accordingly, an invalid use of this call service is prevented, so that an occurrence of a call charge by the invalid use can be restrained.

According to the present invention, the control unit for the call may be a telephone control unit such as a PBX (Private Branch Exchange) and an access point to ISDN (Integrated Services Digital Network), and also an access point to the Internet. The server may be, for example, a Web server and an E-mail server. What can be applied as the terminal device may be, e.g., a fixed type telephone or a mobile telephone having an Internet connecting function, or a computer (e.g., a personal computer, a workstation, a mobile computer) having the Internet connecting function and an Internet telephony function.

According to another aspect of the present invention, a speech communication service providing system comprises: a server connected to the Internet; and a plurality of call control units of speech communications. The server includes: (A) a module of generating, when receiving a piece of first address information as a piece of address information of a call destination of a speech communication from a terminal device, a piece of call identifying information corresponding to the first address information; (B) a module of storing the call identifying information and the first address information; (C) a module of obtaining second address information as a piece of address information of the control unit corresponding to positional information of the terminal device among the plurality of control units; (D) a module of notifying the terminal device of the call identifying information and second address information; and (E) a module of notifying, when receiving the call identifying information from the control unit, if the same call identifying information is stored in the storing module, the control unit of the first address information corresponding thereto. The control unit includes: (a) a module of inquiring of, when receiving a call including the call identifying information from the terminal device, the terminal device transmitting the call using the second address information received from the server, the server about the first address information corresponding to the call identifying information included in the call; and (b) a module of performing, when receiving the corresponding first address from the server, processes in order that the call from the terminal device to arrive at another terminal device corresponding to the first address information.

According to the present invention, the control unit suited most to the position of the terminal device is allocated. For instance, the control unit existing in a position closest to the position of the terminal device is allocated. With this contrivance, in a case where the call charge becomes larger as a distance between the terminal device and the control unit becomes longer, the call charge can be minimized, whereby an amount of the call charge can be restrained.

According to the present invention, the control unit may transmit, only when receiving a response signal from another terminal device received the call from the terminal device, a response signal corresponding to the call from the terminal device to the terminal device.

If the control unit does not transmit the response signal back in response to the call from the terminal device, neither the call state nor the call charge occurs therebetween. Hence, if the architecture described above is adopted, the control unit does not send the response signal back to the terminal device in a case where another terminal device does transmit the response signal back, so that the control unit and the terminal device are not brought into the call state. It is therefore feasible to restrain an occurrence of the charge for the call between the control unit and the terminal device.

Further, according to the present invention, the second address information may be a piece of called party charge address information, and an installer (a call service provider) of the control unit may be burdened with a part or the whole of a charge for the speech communication between the terminal device and another terminal device.

According to this architecture, it is possible to restrain the occurrence of the call charge or an amount of the call charge that should be imposed on the installer itself in the architecture described above.

Further, according to the present invention, the server may give advertisement information to the terminal device and notify the terminal device of the call identifying information and the second address information on condition that the user of the terminal device is to browse the advertisement information.

According to this architecture, the call service provider is able to obtain an amount of money equivalent to make the user browse the advertisement from a sponsor of the advertisement.

DESCRIPTION OF THE PREFERRED EMBODIMENTS

Embodiments of the present invention will hereinafter be described. The following embodiments will be discussed by way of exemplification, and the present invention is not limited to architectures in the embodiments.

First Embodiment

Figure 1:
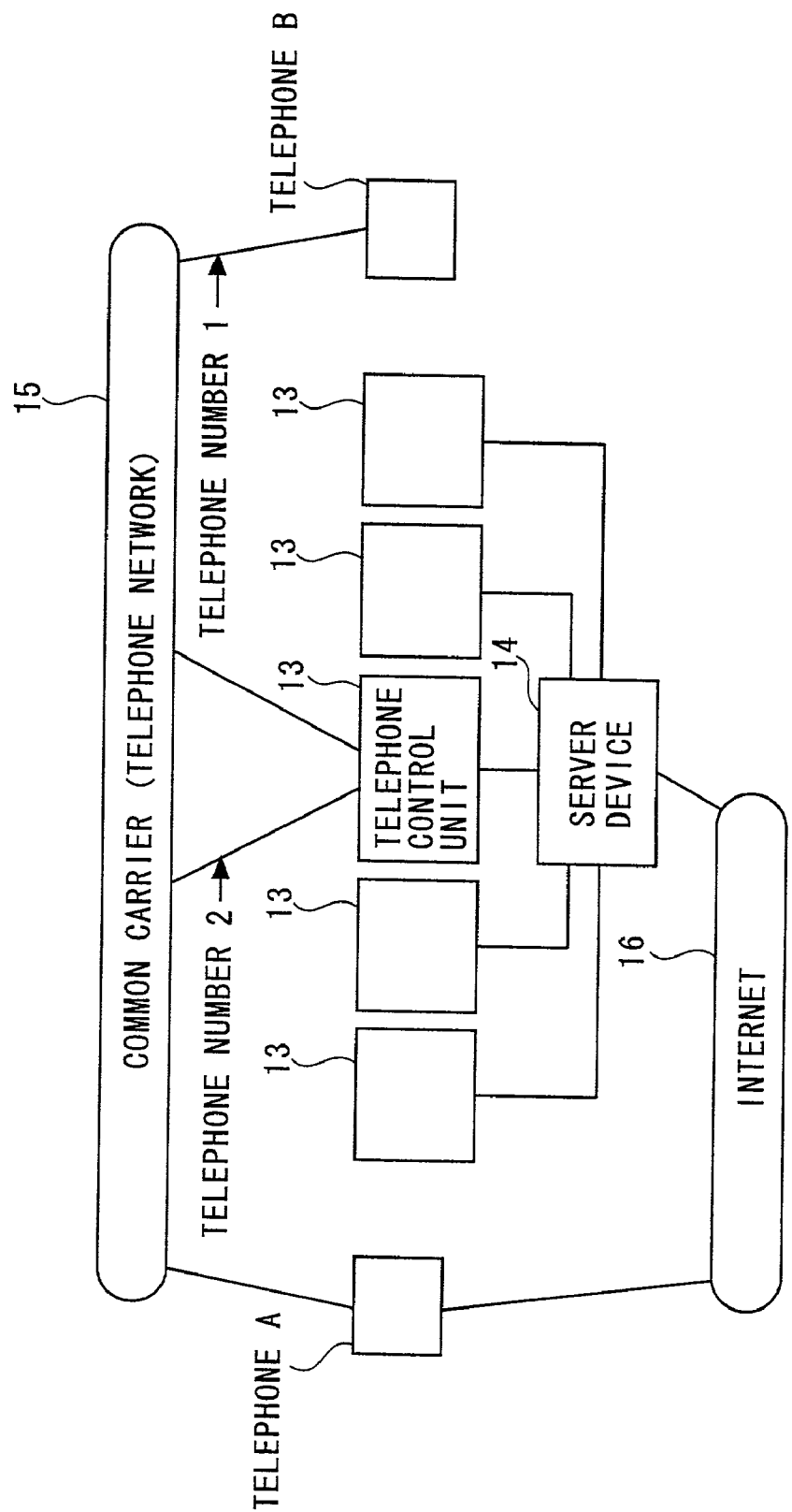
FIG. 1 is a diagram showing a system architecture in a first embodiment.

FIG. 1 is a diagram showing a system architecture in a first embodiment. Referring to FIG. 1, the system is configured by at least one telephone control unit 13 (five pieces of telephone control units 13 are illustrated by way an example in FIG. 1), a server device (which will hereinafter simply be called a [server] as the case may be) 14 connected to the plurality of telephone control units 13, and telephones A and B each connected via a network of a common carrier to any one of the telephone control units 13.

The plurality of telephone control units 13 and the server 14 are installed by a service provider (SP) for providing a discount service of a charge for a telephone call. Only one of the telephone control units 13 may also be installed.

The server 14 controls each of the plurality of telephone control units 13. Further, the server 14 is connected to an Internet 16 and functions as a Web server for providing a Web site. The telephone A is classified as a mobile telephone implementing an Internet connecting function and is accessible based on HTTP (HyperText Transfer Protocol) to the server 14 via the Internet 16. A user of the telephone A is thereby capable of browsing the Web site provided by the server 14.

The telephone A corresponds to a terminal device according to the present invention, while the telephone B corresponds to another terminal device according to the present invention. Further, the telephone control unit 13 corresponds to a control unit according to the present invention.

Figure 16:
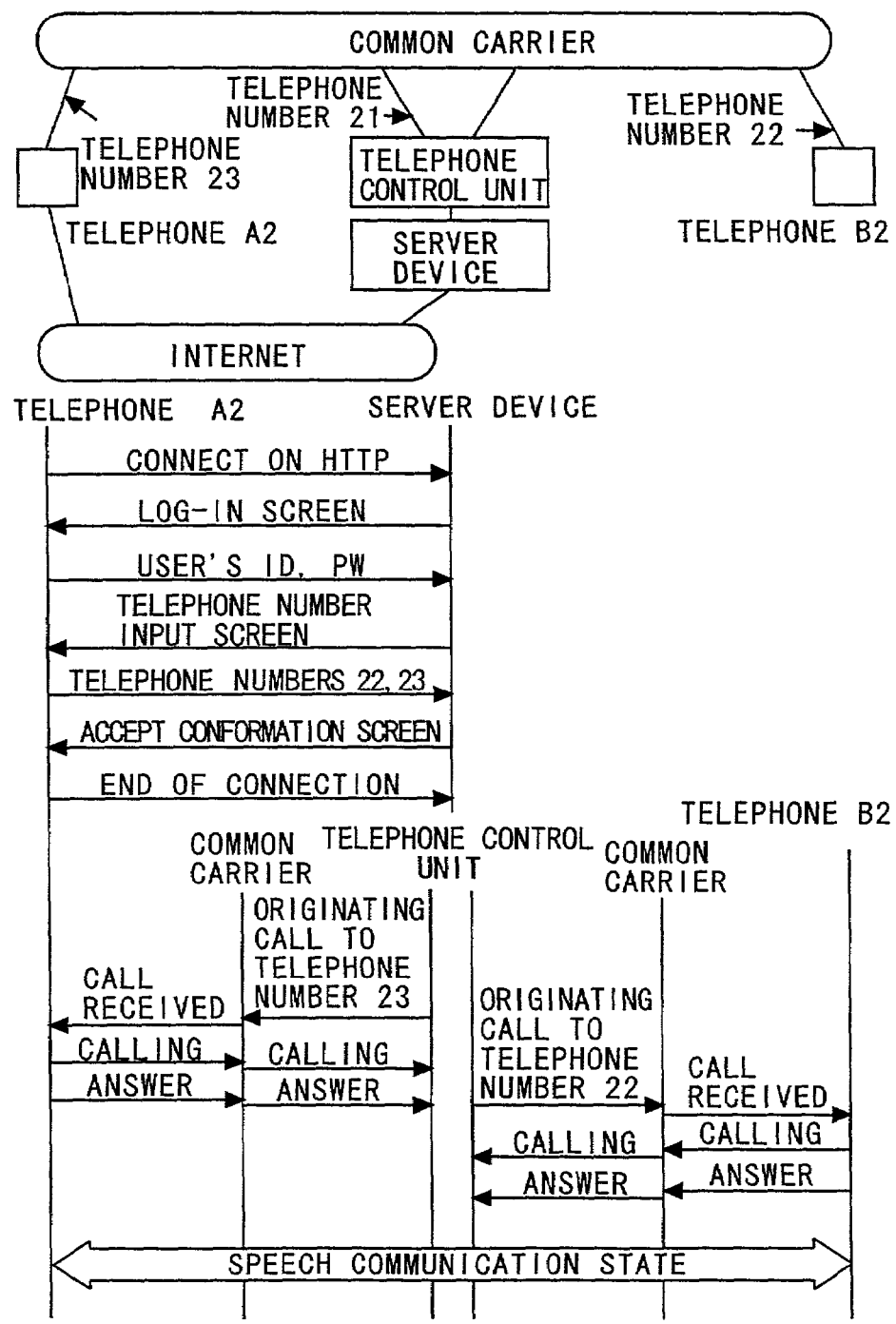
FIG. 16 is an explanatory diagram showing a second prior art.
Figure 17:
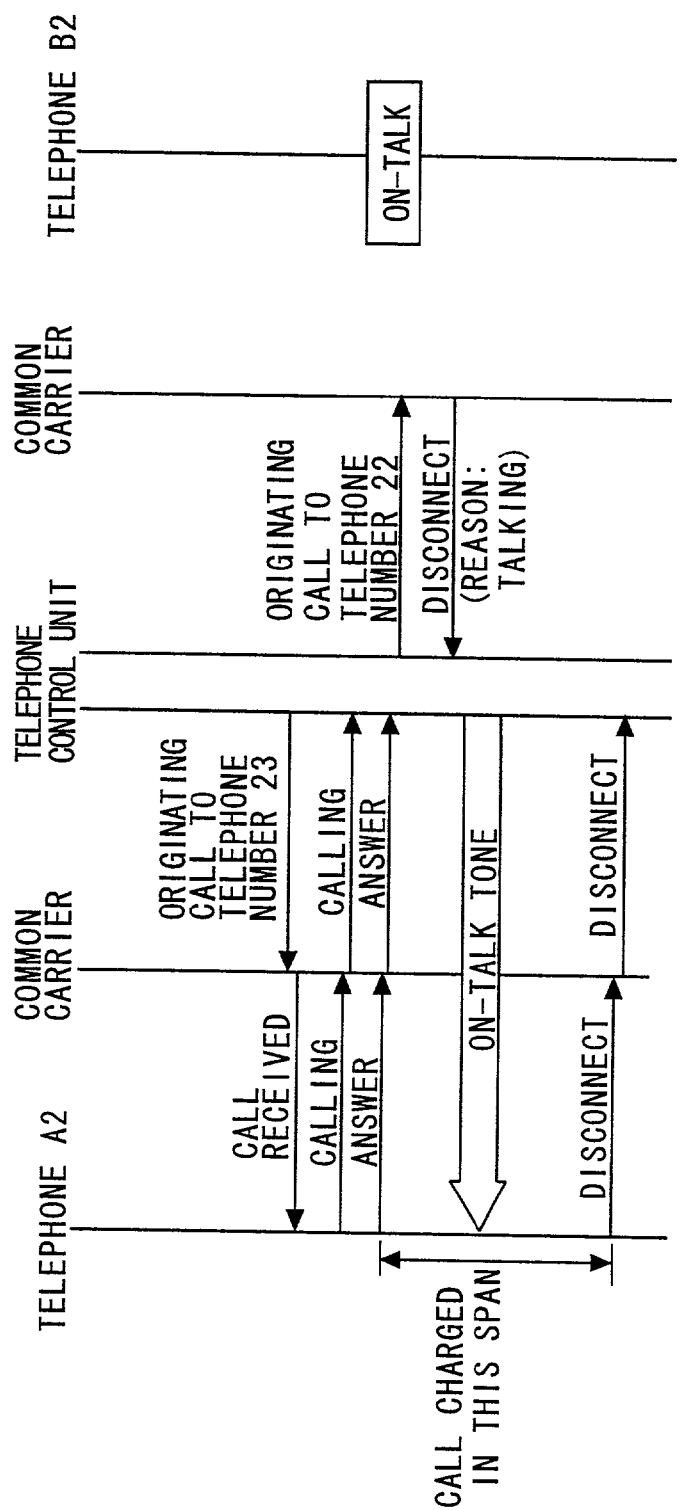
FIG. 17 is an explanatory diagram showing a problem inherent in the second prior art.
Figure 18:
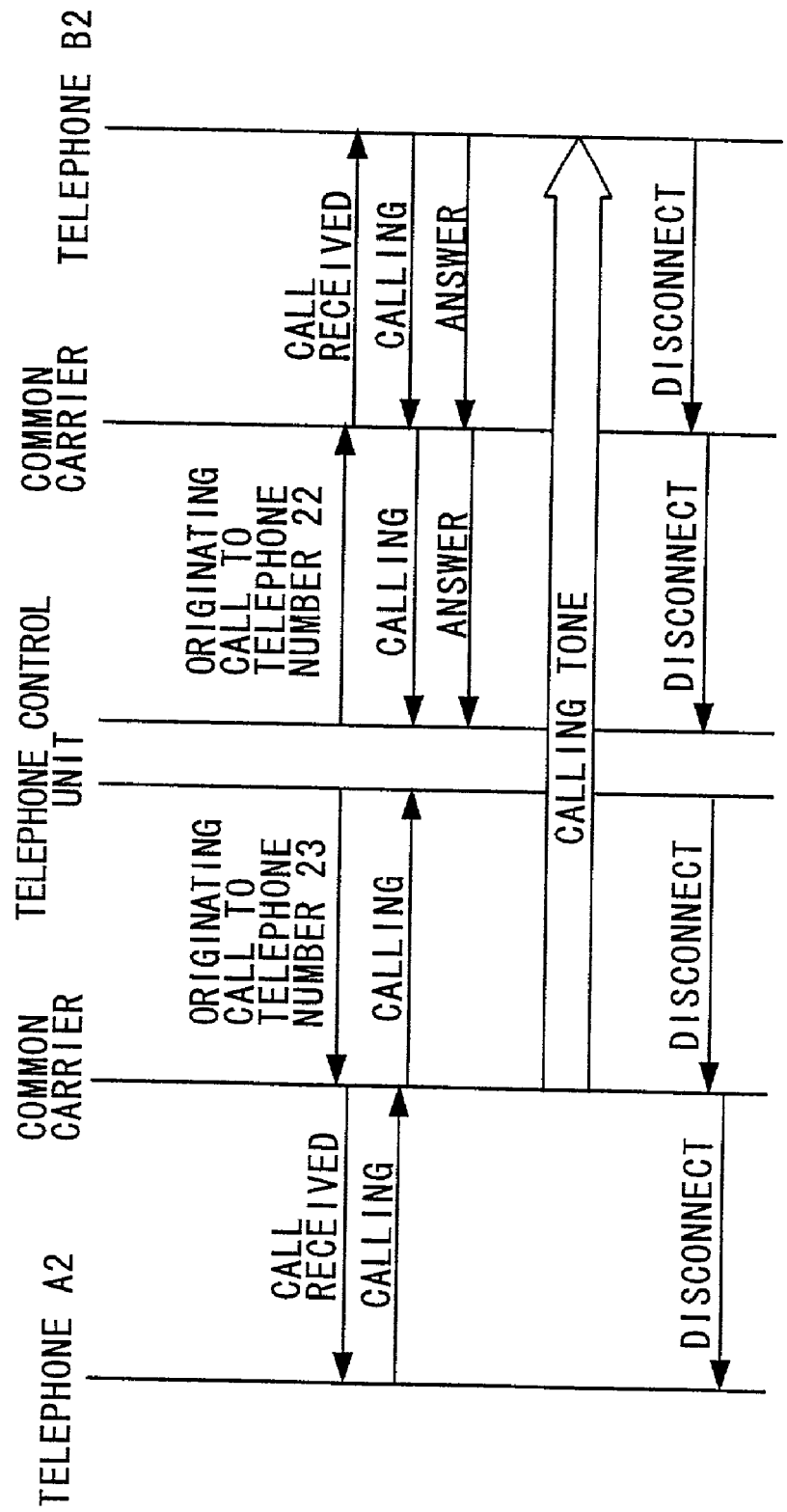
FIG. 18 is an explanatory diagram showing a problem inherent in the second prior art.

A physical architecture of the system in the first embodiment is the same as that in the second prior art (see FIG. 16). Operations of the telephone control unit 13 and of the server 14 are, however, largely different.

Figure 2:
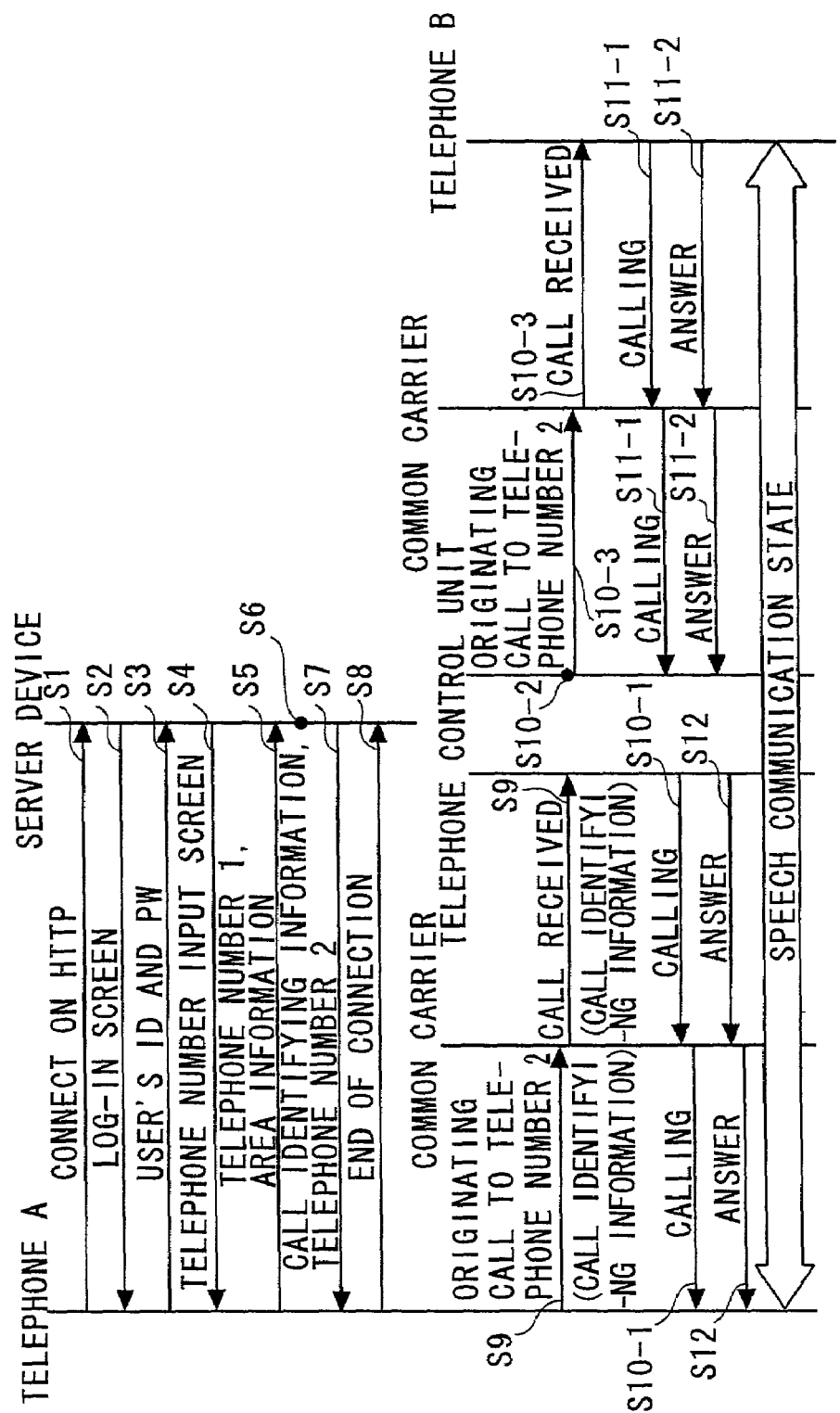
FIG. 2 is a sequence diagram showing an operational example in the first embodiment.

FIG. 2 is a sequence diagram showing an operational example in the system according to the first embodiment. The operation is as follows.

<Step S1> The user of the telephone A, when dialing a phone number of the telephone B (a telephone number is 1), at first accesses the server 14 on the basis of HTTP. Note that the user of the telephone A is previously notified of an address (URL: Uniform Resource Locator) for accessing the server 14 by a known method.

<Step S2> The server 14 transmits to the telephone A an HTML (HyperText Markup Language) file for displaying a log-in screen 17.

<Step S3> The telephone A, when receiving the HTML file, displays the log-in screen 16 based on a description of HTML file on an unillustrated display device (display) provided in the telephone A. The user of the telephone A inputs a user's ID and PW (Password) on the log-in screen 17. The telephone A transmits the inputted user's ID and PW to the server 14.

<Step S4> The server 14 checks the user's ID and PW and, if a result is "OK", transmits to the telephone A the HTML file for displaying an input screen 18 (see FIG. 4) for a telephone number and area information. The input screen 18 is a screen used for the user to input a telephone number of a destination terminal (the telephone number of the telephone B) and a piece of area information for indicating a location of the telephone A. Note that the server 14, if the check result of the user's ID and PW is "NG" (implying invalidity rather than no good), requests the telephone A to input once again. If the valid user's ID and PW can not be obtained even when inputted again, an error message is issued to the telephone A. Users who do not subscribe this speech communication (call) service are thereby ruled out when trying to utilize this service.

Figure 4:
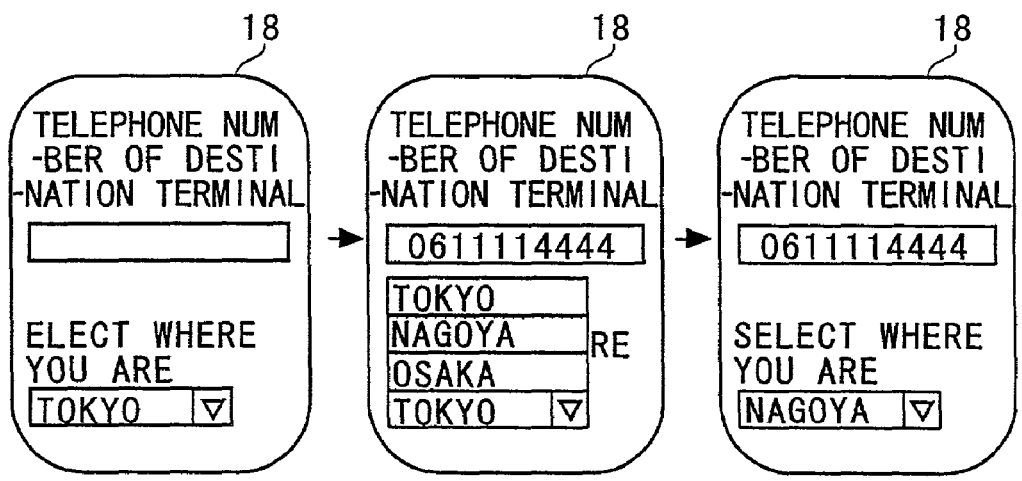
FIG. 4 is an explanatory diagram showing an input screen for a telephone number and area information.

<Step S5> The telephone A, when receiving the HTML file, displays the input screen 18 on the display in accordance with the description of HTML file. The user of the telephone A operates the telephone A and thus inputs a telephone number of the destination terminal (which corresponds to first address information) and the area information on the input screen 18 displayed thereon. FIG. 4 shows an example where a telephone number 1 (061111444) as the telephone number of the destination terminal and the area information "Nagoya", are inputted. The telephone A transmits the inputted telephone number and area information to the server 14. Note that a condition for minimizing a charge imposed on the user of the telephone A may also be inputted as a substitute for the area information.

<Step S6> The server 14 generates a call identifying information and stores the call identifying information and the telephone number 1 in an unillustrated storage device (memory) provided with in the server 14. The call identifying information is a unique piece of information for identifying the telephone number (telephone number 1) of the destination terminal, and is used for the telephone control unit 13 to obtain the telephone number of the destination terminal. Therefore, the same call identifying information is not used at the same time. Note that the call identifying information may involve the use of random numbers having a predetermined number of digits (e.g., 8) generated by an unillustrated processor (e.g., a CPU, an MPU) provided in the server 14. In this case, the call identifying information may be called a call identifying code.

<Step S7> The server 14, based on the area information received, locates the telephone control unit 13 closest to the telephone A and obtains a telephone number (corresponding to second address information) defined as a telephone number of the thus located telephone control unit 13. For instance, the server 14 has a table stored with the telephone numbers of the telephone control units corresponding to pieces of area information, and searches a corresponding telephone number 2 from the area information received, there by obtaining the desired telephone number 2. Thereafter, the server 14 transmits the HTML file for displaying a call originating screen 19 (see FIG. 5) to the telephone A. This HTML file contains the call identifying information and the telephone number 2.

<Step S8> The telephone A, when receiving the HTML file, displays the call originating screen 19 on the display in accordance with the description of HTML file. Then, the telephone A gets disconnected from the server 14.

<Step S9> The user of the telephone A dials the telephone number 2 (of the telephone control unit 13) on the call originating screen 19. In the example shown in FIG. 5, a button 20 showing a character string of "Dialing" is displayed on the call originating screen 19. When the user presses this button 20 by operating the telephone A, the telephone A originates a call of the telephone number 2 contained in the HTML file. The telephone A is thereby capable of accessing the telephone control unit 13 (corresponding to the area information) specified by the server 14. When originating the call, call control information containing the call identifying information is transmitted to the telephone control unit 13 from the telephone A. At this time, the call identifying information is contained, as an in-the-call-control-information parameter, for instance, in receiving-side sub address information in the call control information.

<Step S10-1> The telephone control unit 13, when receiving a call containing the call identifying information as a parameter, transmits a calling tone to the telephone A.

<Step S10-2> Subsequently, the telephone control unit 13 inquires of the server 14 about the telephone number 1 corresponding to the call identifying information. Namely, the telephone control unit 13 notifies the server 14 of the call identifying information, and obtains the telephone number 1 corresponding to this piece of call identifying information from the server 14.

<Step S10-3> The telephone control unit 13, when obtaining the telephone number 1, dials the telephone number 1 (of the telephone B) by use of another telephone line (via the network 15 of the common carrier).

<Step S11-1> The telephone B emits a ringing when receiving the call from the telephone control unit 13, and transmits this calling tone back to the telephone control unit 13.

<Step S11-2> Thereafter, when the user of the telephone B executes an operation of response, the telephone B transmits a response signal to the telephone control unit 13.

<Step S12> The telephone control unit 13, when receiving the response signal from the telephone B, transmits a response signal to the telephone A. Thereafter, the telephone control unit 13 sets both of the telephones A and B in a call state.

With the processes executed above, the user of the telephone A is able to speak to the user of the telephone B by giving a call to the telephone B.

In the operational example described above, advertisement information (not shown) may be displayed on at least one of the log-in screen 17, the input screen 18 and the call originating screen 19. Alternatively, an advertisement screen may be transmitted in any one of steps before transmitting the call originating screen 19. With this contrivance, the user of the telephone A invariably browses the advertisement in a process of dialing a phone number of the telephone B by use of the system shown in FIG. 1.

Based on this contrivance, the service provider (SP) is burdened with the whole charge for the call between the telephone A and the telephone B or discounts the call charge. The user of the telephone A is thereby able to have a call cheaper than a normal charge under the condition that user must browse the advertisement.

Note that if one single telephone control unit 13 is installed, there is no necessity of inputting the area information, and hence the input box for inputting the area information may be omitted from the input screen 18. Further, the server 14 does not search the telephone number 2 corresponding to the area information and simply reads the telephone number 2 stored previously.

The followings are characteristic operations in the operational example described above.

(A) The telephone number 1 and the area information are transmitted via the Internet 16 to the server 14 from the telephone A.

(B) The server 14 generates the call identifying information and is stored with the call identifying information and the telephone number 1.

(C) The server 14 transmits the telephone number 2 (of the telephone control unit 13 closest to the location of the telephone A) determined based on the area information and the call identifying information to the telephone A via the Internet 16.

(D) The telephone A dials the telephone number 2 by use of the call control information containing the call identifying information.

(E) The telephone control unit 13 obtains the telephone number 1 corresponding to the call identifying information from the server 14, and dials the telephone number 1.

(F) The telephone control unit 13, when receiving the response signal from the telephone B, transmits a response signal to the telephone A.

Figure 6:
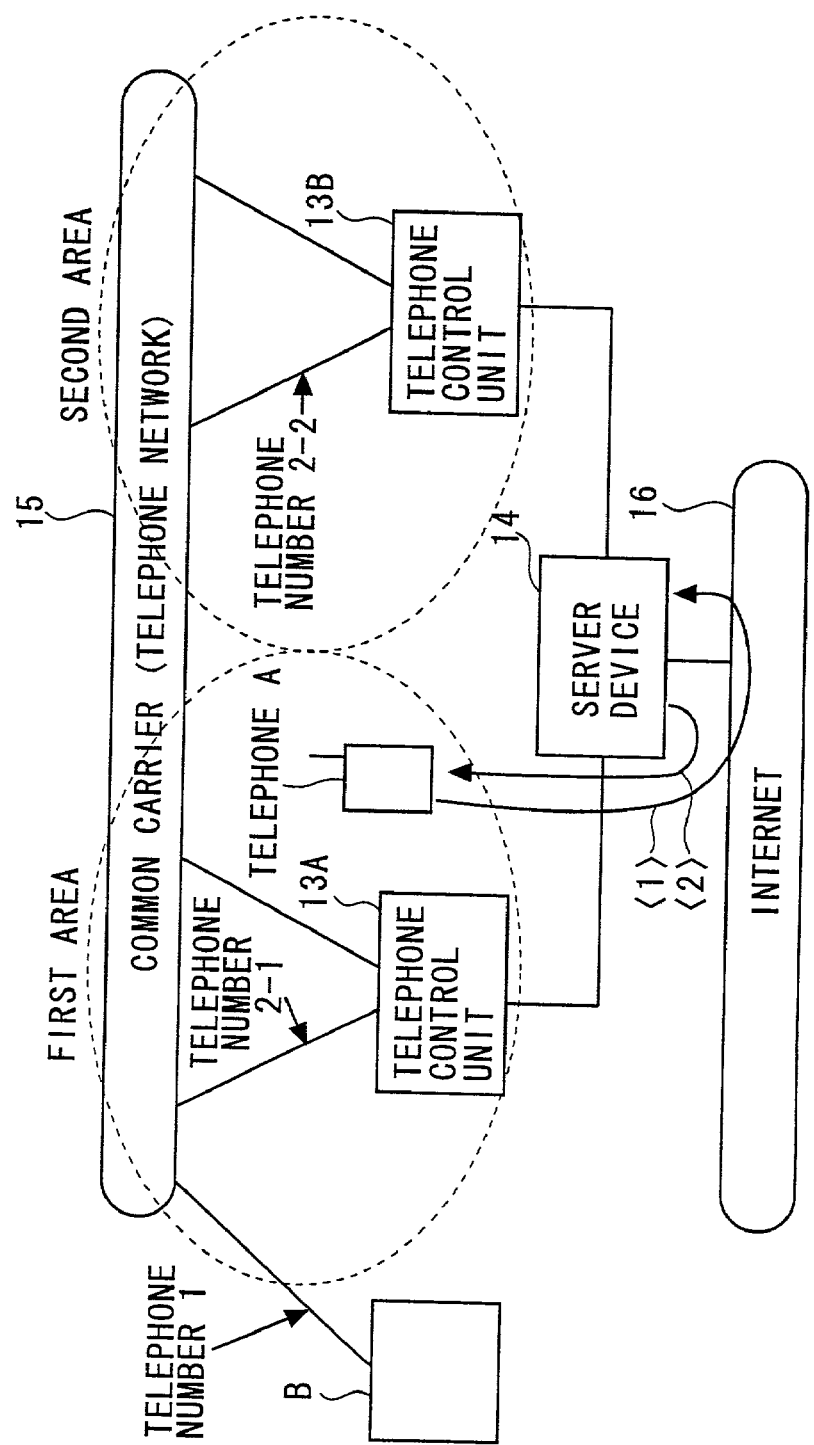
FIG. 6 is an explanatory diagram showing an operation in the first embodiment.

Functions in the operations (A)~(C) described above will be explained referring to a function explanatory diagram in FIG. 6. Referring to FIG. 6, it is assumed that the SP prepares two sets of telephone control units 13A, 13B, the telephone control unit 13A is installed in a first area, and the telephone control unit 13B is installed in a second area. In this example, the first and second areas indicate geometrical areas such as Tokyo and Osaka.

The SP performs such a setting that the telephone control unit 13A is used if the telephone A (mobile telephone) exists in the first area, and the telephone control unit 13B is used if the telephone A exists in the second area. This is because the speech communication (call) charge generally becomes higher as a distance between the telephone and the telephone control unit gets larger, and therefore, if using the telephone control unit existing in a geometrically far area from the telephone, there increases the call charge with which the SP should be burdened.

On the other hand, the single server 14 to be prepared may suffice for a case where the plurality of telephone control units are installed. The reason for this is that the cost for the communications via the Internet 16 has no relation with the distance.

The user of the telephone A, when dialing the telephone number 1, transmits the telephone number 1 (of the destination terminal) and the area information to the server 14. In the example shown in FIG. 6, the telephone A exists in the first area, and hence the user of the telephone A transmits the telephone number 1 and the area information indicating the first area to the server 14 (<1> in FIG. 6).

The server 14, when receiving the telephone number 1 and the area information, creates the call identifying information and selects the telephone control unit suited to the telephone A on the basis of the area information. Then, the server 14 the telephone number thereof and the call identifying information to the telephone A via the Internet 16 (<2> in FIG. 6).

In the example shown in FIG. 6, the server 14 selects the telephone control unit 13A on the basis of the area information of the first area that has been received from the telephone A, and transmits, to the telephone A, a telephone number 2-1 as the telephone number of the telephone control unit 13A and the call identifying information. The telephone A is thereby capable of obtaining the telephone number 2-1 of the closest telephone control unit 13A and the call identifying information.

The following effects can be obtained owing to the functions described above.

The SP may notify the user of the address information (URL) of the server 14.
 The server 14 automatically selects the optimum communication route in terms of the call charge in accordance with the location of the user (which is the position of the telephone A).
 The SP enables the user of the telephone A utilizing the call service described above to browse the advertisement.

Next, the functions in the operations (D)~(F) will be explained. The telephone A, when obtaining the telephone number 2-1 of the closest telephone control unit 13A and the call identifying information from the server 14, dials the telephone number 2-1. This call originating (dialing) is executed by the telephone A's transmitting the call control information to the telephone control unit 13A. The call control information contains the call identifying information obtained from the server 14.

The telephone control unit 13A, if the call control information received when receiving the call contains the call identifying information, sends the call identifying information to the server 14, and inquires of the server 14 about a telephone number corresponding to the call identifying information (step S10-2). The server 14 is stored with the telephone number corresponding to the call identifying information, and therefore transmits the telephone number (telephone number 1) corresponding thereto back to the telephone control unit 13A.

If the call identifying information received by the telephone control unit 13A when receiving the call is invalid, the server 14 is not stored with that piece of call identifying information and therefore sends back to the telephone control unit 13A a notification (NG notification) that the call identifying information is "NG (No Good) (invalid)" as a substitute for the corresponding telephone number (step S10-4).

Figure 7:
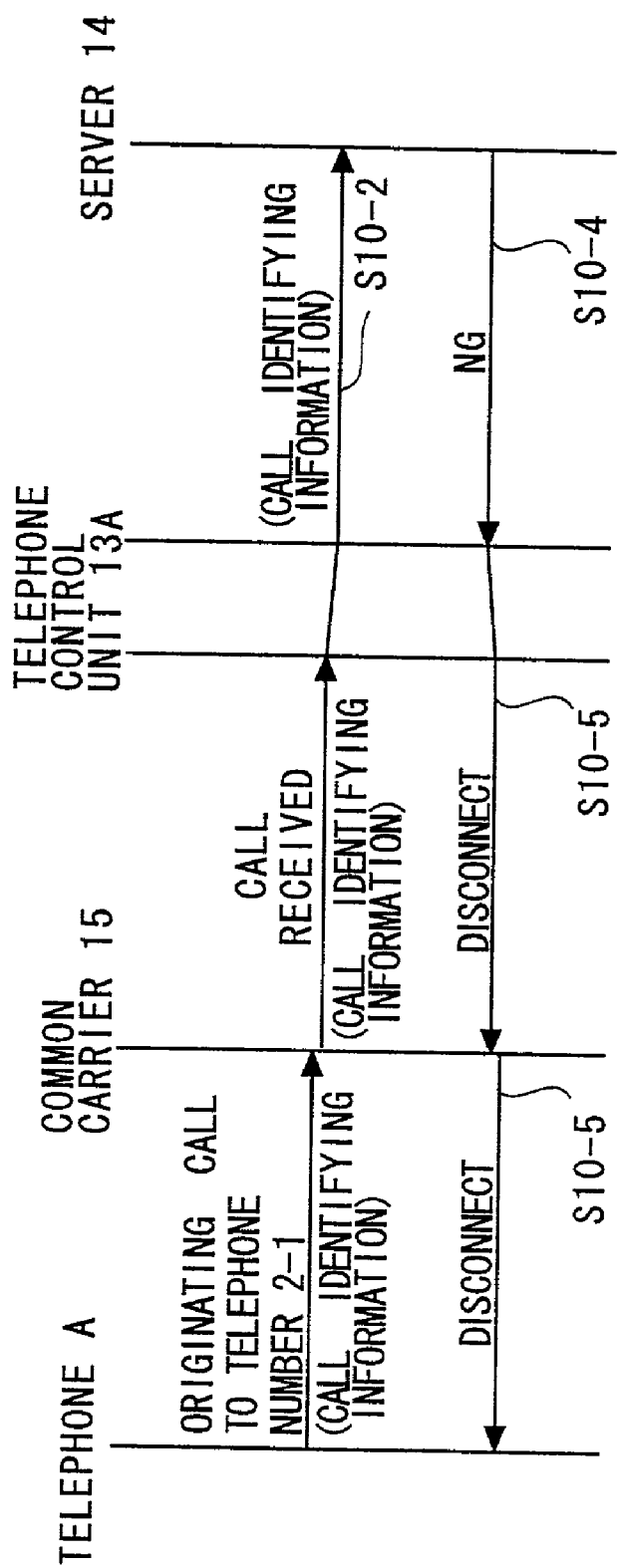
FIG. 7 is a sequence diagram showing an operational example in the first embodiment.

The telephone control unit 13A, when receiving the NG notification from the server 14, performs the operation shown in FIG. 7. Namely,the telephone control unit 13A, upon receiving the NG notification from the server 14, transmits a disconnect signal to the network 15. The network 15 transmits the disconnect signal to the telephone A (step S10-5). The connection process between the telephone A and the telephone B thereby comes to an end. Herein, the telephone control unit 13A does not yet transmits a response signal to the telephone A, and hence the call does not yet become the call state. the charge for the call does not occur.

While on the other hand, if the call identifying information is valid, the telephone control unit 13A, when receiving the telephone number (the telephone number 1) corresponding to the call identifying information, dials the received telephone number (the telephone number 1) (step S10-3: see FIG. 2). For this dialing, if the telephone B as the telephone corresponding to the telephone number 1 answers, the response signal is transmitted from the telephone B to the telephone control unit 13A. The telephone control unit 13A, in the case of receiving this response signal, transmits the response signal to the telephone A and performs the control to establish the call state between the telephone A and the telephone B.

Figure 8:
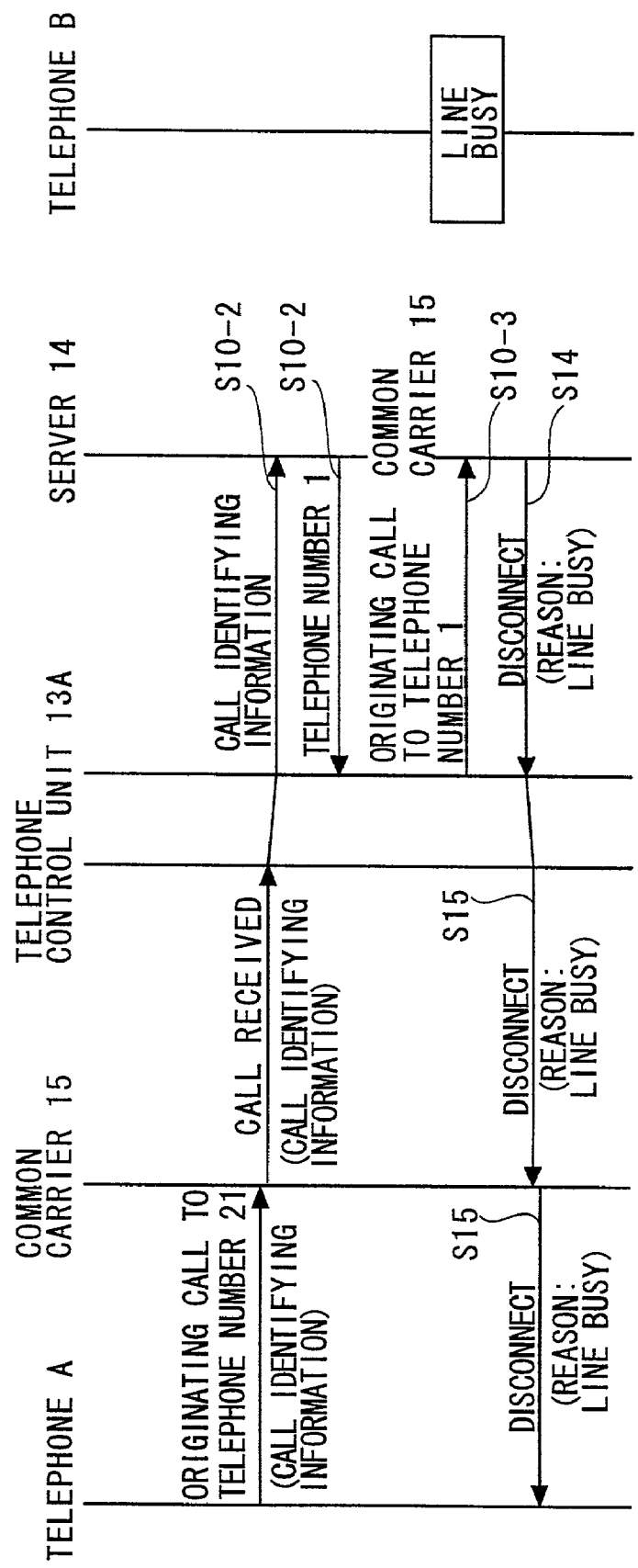
FIG. 8 is a sequence diagram showing an operational example in the first embodiment.

By contrast, if the line of the telephone B is busy, the telephone control unit 13A executes the operation shown in FIG. 8. Referring to FIG. 8, the telephone control unit 13A, if dialing the telephone number 1 but its line is busy, receives the disconnect signal from the network 15 of the common carrier (step S14). Based on this, the telephone control unit 13A transmits the disconnect signal to the network 15. The disconnect signal is thereby transmitted from the network 15 to the telephone A (step S15). With this process, the connection process between the telephone A and the telephone B finishes without establishing the call state. Herein, the telephone control unit 13A does not transmit the response signal to the telephone A, so that the call does not come to the call state and the call charge does not occur.

The following effects can be obtained owing to the functions described above.

If the line of the call destination is busy, and if there is no answer, the occurrence of the call charge is restrained.
 If an unregistered user (non-subscriber of the call service) tries to access, this user is unable to obtain the call identifying information and the telephone number 2. Accordingly, the occurrence of the call charge is restrained.

Second Embodiment

Figure 9:
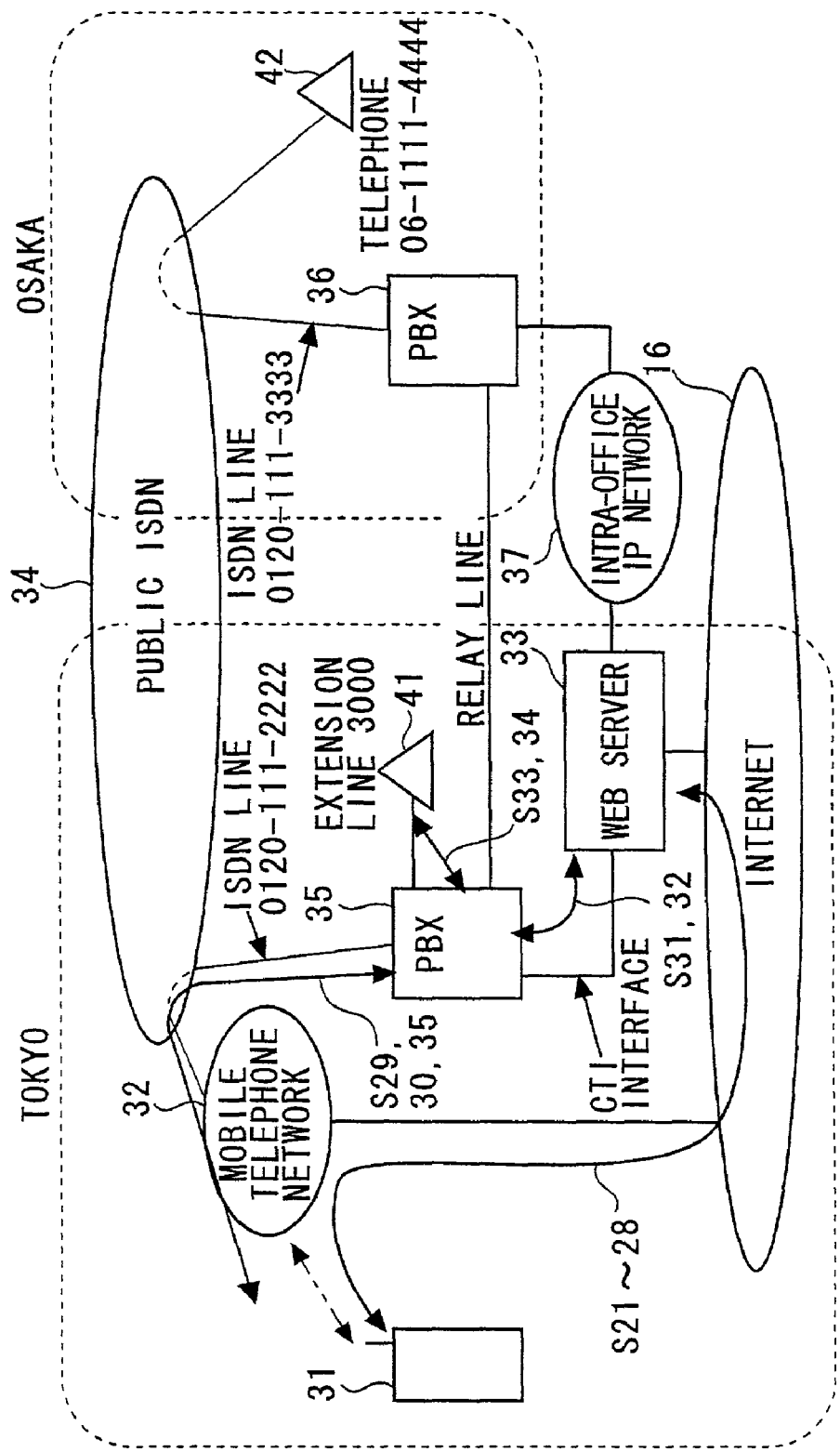
FIG. 9 is a diagram showing a system architecture in a second embodiment.

FIG. 9 is a diagram showing a system architecture in a second embodiment. The system shown in FIG. 9 is a system for actualizing a service in which an enterprise (which is hereinafter called a company) is burdened with a call charge if an employee uses his or her own mobile telephone for the business (such as informing a business matter).

Referring to FIG. 9, a mobile telephone 31 is classified as a mobile telephone individually owned by the employee of the company, and is connected wirelessly to a mobile telephone network 32. Further, the mobile telephone 31 implements, in addition to call originating/receiving function, a function of browsing contents of a Web server 33 connected to the Internet 16. Note that the mobile telephone 31 in the second embodiment is to be assumed to be a cellular phone i-mode.

The mobile telephone network 32 is connected to a public ISDN (Integrated Services Digital Network) 34 and the Internet 16. The mobile telephone network 32 executes a call originating/receiving connection process between the network 32 itself and the public ISDN 34, and executes an IP packet forwarding/receiving process between the network 32 itself and the Internet 16.

The Web server 33 is installed by the company and connected to the Internet 16. Further, the company has PBXs (Private Branch Exchanges) 35, 36 installed as telephone control units. The PBX 35 and the PBX 36 are installed in areas different from each other. for example, the PBX 35 is installed in an office in Tokyo, while the PBX 36 is installed in an office in Osaka.

Each of the PBXs 35, 36 has a CTI (Computer Telephony Integration) interface. The PBX 35 is connected to the Web server 33 by use of the CTI interface, and the PBX 36 is connected to the Web server 33 via an intra-office IP network 37 by use of the CTI interface. With this architecture, each of the PBXs 35, 36 is capable of transferring and receiving the information in a variety of categories to and from the Web server 33.

Further, the PBXs 35, 36 are connected to each other via a relay line, whereby the information can be transferred and received between the PBXs 35, 36. Further, each of the PBXs 35, 36 is connected via an ISDN line to the public ISDN 34. A number (0120-111-2222) of the ISDN line that connects the PBX 35 to the public ISDN 34 and a number (0120-111-3333) of the ISDN line that connects the PBX 36 to the public ISDN 34, are defined as called party charge telephone numbers. The company is burdened with charges for the calls dialing these numbers.

The mobile telephone 31 corresponds to a terminal device according to the present invention, and the telephones 41, 42 corresponds to other terminal devices according to the present invention. The PBXs 35, 36 correspond to control units according to the present invention, and the Web server 33 corresponds to a server according to the present invention.

Next, an operational example in the system in accordance with the second embodiment will be explained. The discussion on this operational example will be focused on a case where the employee who owns the mobile telephone 31 dials a phone number of the telephone 41 (an extension phone number is 3000) classified as an extension telephone terminated by the PBX 35.

The employee, when giving a call to the telephone 41 by use of the mobile telephone 31, operates the mobile telephone 31 and transmits to the mobile telephone network 32 the address information (URL) of the Web server 33, of which the mobile telephone 31 has been notified beforehand. An execution of the following process is triggered by this transmission.

<Step S21> The mobile telephone 31 accesses the Web server 33 via the mobile telephone network 32 and the Internet 16.

Figure 3:
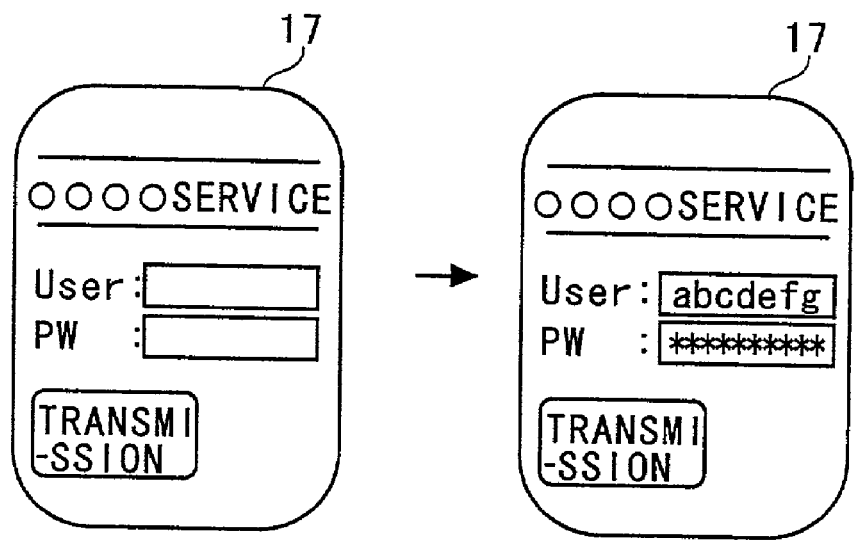
FIG. 3 is an explanatory diagram showing a log-in screen.

<Step S22> The Web server 33 transmits the log-in screen 17 (see FIG. 3) to the mobile telephone 31 via the Internet 16 and the mobile telephone network 32 as well.

<Step S23> The mobile telephone 31 receives the log-in screen 17, and the log-in screen 17 is displayed on the unillustrated display device (display) provided on the mobile telephone 31. Then, the employee operates the mobile telephone 31 and inputs the user's ID and PW of the employee himself or herself on the log-in screen 17. The mobile telephone 31 transmits the inputted user's ID and PW to the Web server 33.

<Step S24> The Web server 33 checks the user's ID and PW received, and, if a result of check is "OK", transmits the input screen 18 (see FIG. 4) for the telephone number to the mobile telephone 31.

<Step S25> The mobile telephone 31 receives the input screen 18 and displays the input screen 18 on the display device. Then, the employee operates the mobile telephone 31 and inputs the telephone number of the destination terminal (the telephone number (3000) of the telephone 41) and the area information on the input screen 18. At this time, the employee stays in Tokyo (the mobile telephone 31 exists in Tokyo area) and therefore inputs a piece of area information "Tokyo". The mobile telephone 31 transmits the inputted telephone number and area information to the Web server 33.

<Step S26> The Web server 33, upon receiving he telephone number "3000", generates a piece of call identifying information (e.g., "12345678") unique to this telephone number "3000", and stores the thus generated call identifying information and the telephone number "3000" corresponding thereto in an unillustrated storage device provided in the Web server 33.

Figure 5:
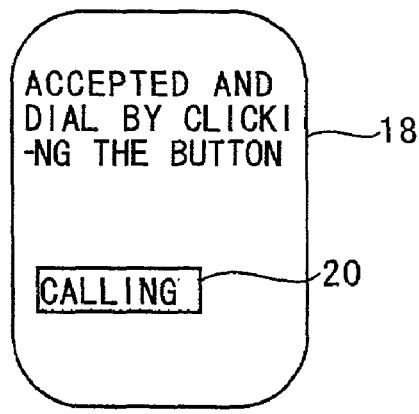
FIG. 5 is an explanatory diagram showing is a call originating screen.

<Step S27> The Web server 33 obtains the telephone number "0120-111-2222" of the ISDN line corresponding to the PBX 35 from the area information named "Tokyo" received from the mobile telephone 31, and transmits to the mobile telephone 31 the HTML file for displaying the call originating screen 19 (see FIG. 5). This HTML file contains the call identifying information "12345678" and the telephone number "0120-111-2222"

<Step S28> The mobile telephone 31, when receiving the HTML file, finishes the connection to the Web server 33 and, based on the HTML file received, displays the call originating screen 19 on the display.

The HTML file received contains, e.g., the following information:

<A href="tel:01201112222*12345678> dialing </A>

The above information is defined by a set of HTML link tags, and, on the call originating screen, as shown in FIG. 5, only the character string "dialing" is displayed. The user is able to make an invert-display of the character string "dialing" by manipulating a key or button provided on the mobile telephone 31. Further, when the user manipulates the key or button for originating a call in the state where the character string "dialing" is invert-displayed, the mobile telephone 31 originates the call to:

Called addess:01201112222

Called sub address: 12345678

Namely, the mobile telephone 31 transmits a calling message (call control information) containing the called address and the called sub address towards the PBX 35. Thus, the employee is able to originate the call with the simple key manipulation by use of the defined-by-link-tag information contained in the received HTML file.

Note that the call identifying information and the telephone number of the telephone control unit (PBX 35) suited to the position of the mobile telephone 31 can also be delivered by an E-mail to the mobile telephone 31. In this case, the user of the mobile telephone 31 inputs to the mobile telephone 31 the telephone number and the call identifying information received by the E-mail, thereby dialing the PBX35 and transmitting the call identifying information to the PBX 35.

<Step S29> When the employee dials the telephone number "0120-111-2222" by using the mobile telephone 31, the call arrives at the ISDN line of "0120-111-2222" via the mobile telephone network 32 and the public ISDN 34.

<Step S30> The mobile telephone 31 is connected to the PBX 35 by executing step S29, and the PBX 35 receives a message containing the called sub address "12345678"(the call identifying information) that has been transmitted from the mobile telephone 31.

<Step S31> The PBX 35 transmits the called sub address "12345678" to the Web server 33 via the CTI interface.

<Step S32> The Web server 33 judges whether the called sub address "12345678" received from the PBX 35 is stored or not. If stored, the Web server 33 transmits to the PBX 35 the telephone number "3000" stored corresponding to "12345678".

<Step S33> The PBX 35, upon receiving the telephone number "3000" from the Web server 33, allowing the call received from the mobile telephone 31 to arrive at the telephone number "3000" (of the telephone 41).

<Step S34> The telephone 41 thereby makes a ringing, and when other employee in the company answers (e.g., performs an off-hook operation such as picking up the receiver), the telephone 41 transmits a response signal to the PBX 35.

<Step S35> The mobile telephone 31 and the telephone 41 come to the call state via the PBX 35 in step S35. This enable the employee to inform other employees in the Tokyo office of the business matter by use of the mobile telephone 31.

In the operational example given above, the telephone number "0120-111-2222" dialed from the mobile telephone 31 is categorized as a called party charge telephone number. Therefore, the charge for the call between the mobile telephone 31 and the telephone 41 is imposed on the company having installed the PBX 35. Hence, the employee, when informing of the business matter by using the employee's own mobile telephone 31, has no necessity of paying this call charge.

Further, if the employee dials a phone number of the telephone 42 (its telephone number is 06-1111-4444) existing in the Osaka office by using the mobile telephone 31, a flow of processing is substantially the same as the above simply by replacing the telephone number "3000" in the example given above with "06-1111-4444".

The telephone number "06-1111-4444" is the number of the public ISDN 34, and therefore the PBX 35 normally catches the ISDN line and originates a call to "06-1111-4444". In this respect, the PBX 35 is connected via a relay line to the PBX 36, so that the following processes may also be executed in place of the processes in the example given above.

The PBX 35, when receiving the telephone number "06-1111-4444" corresponding to the call identifying information from the Web server 33, catches the relay line and gives the call to "06-1111-4444". The telephone number "06-1111-4444" is thereby transmitted to the PBX 36 from the PBX 35.

The PBX 36, when receiving the telephone number "06-1111-4444", catches the ISDN line and originates the call to the telephone number via the public ISDN 34. With this process, the telephone 42 makes a ringing.

When the user of the telephone answers, the telephone 42 transmits a response signal back to the PBX 36. The mobile telephone 31 and the telephone 42 are thereby brought into the call state via the PBXs 35, 36.

In the example described above, when the PBX 35 dials the telephone number "06-1111-4444", a PBX-to-telephone distance (via the public ISDN) is shorter in the case of sending the call to the public ISDN 34 from the PBX 36 than in the case of sending the call to the public ISDN 34 from the PBX 35, and consequently a fee for utilizing the public ISDN 34 is cheaper. The processes described above are therefore effective in terms of reducing the call charge imposed on the company.

The mobile telephone 31 might move to Osaka. In this case, the owner of the mobile telephone 31, if notifying of the area information in step S25, may simply transmit a piece of area information "Osaka" to the Web server 33. Then, the Web server 33 notifies the mobile telephone 31 of an ISDN line number "0120-111-3333" of the PBX 36 in step S27. The mobile telephone 31 therefore connects to the PBX 36 by originating a call on the call originating screen 39. Accordingly, the user (employee) of the mobile telephone 31 can automatically separately use the PBX 35 and the PBX 36 simply by notifying the Web server 33 of the area covering the location of the mobile telephone 31, i.e., which area, Tokyo or Osaka, the mobile telephone 31 exists. In this case, the PBX telephone numbers "0120-111-2222" and "0120-111-3333" are embedded in between the set of HTML link tags on the call originating screen 19 and are thus given to the mobile telephone 31. Hence, the user (employee) of the mobile telephone 31 may not be aware of these PBX telephone numbers.

According to the second embodiment, the following effects can be obtained. To be specific, the great majority of companies lend the mobile telephones owned by the companies to some of the employees, and these mobile telephones are utilized for informing of the business matters. In the second embodiment, if the employee uses his or her own mobile telephone for the business matter, this call charge is imposed on the company, and therefore the employee can perform the business using the individual's mobile telephone without any anxiety for the call charges, and the company has a merit of decreasing the number of mobile telephones which should be lent, resulting in a reduction in expenditures.

Third Embodiment

Figure 10:
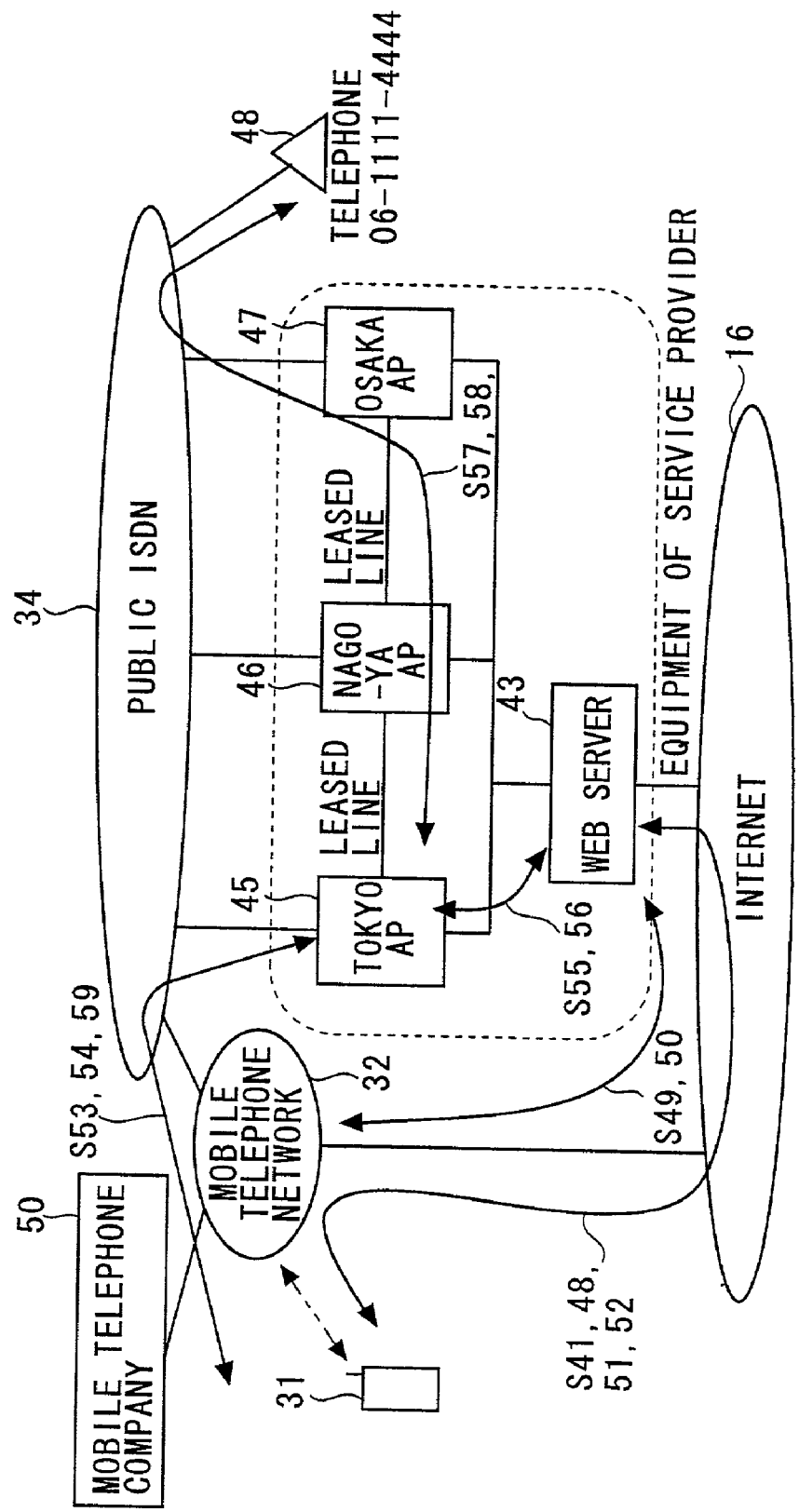
FIG. 10 is a diagram showing a system architecture in a third embodiment.

FIG. 10 is a diagram showing a system architecture in a third embodiment. FIG. 10 shows an example where the service provider (SP) provides a call charge discount service as a business. The business actualized by this system has the following business structure. That is, the SP invites advertisements from sponsors and provides a service of discounting some proportion or the whole of the call charge with an exchange for a user's browsing the advertisement (which will hereinafter be called a [discount service], and the burden of the call charges in this discount service is covered by a revenue of advertisement fees gained from the sponsors.

Referring again to FIG. 10, the mobile telephone 31 is a phone owned by the user of the discount service and has the same configuration and functions as those explained in the second embodiment, of which the repetitive explanations are herein omitted.

A Web server 43 is installed by the SP and connected to the Internet 16. Further, the SP sets access points (AP) 45, 46, 47 to the Internet 16 respectively in Tokyo, Nagoya and Osaka, and connects the APs 45, 46, 47 by leased lines. Called party charge telephone numbers are allocated as telephone numbers of the APs 45, 46, 47. The APs 45, 46, 47 are each connected via a line to the Web server 43, and the APs 45, 46, 47 and the Web server 43 transmit and receive pieces of information in a variety of categories in the form of IP packets etc.

By the way, one of mobile telephone (cellular phone) enterprises (companies) provides a service of providing positional information of the mobile telephone (cellular phone) According to the third embodiment, the Web server 43 implements a function of inquiring of a mobile telephone company 50 about the positional information of the mobile telephone 31 (which will hereinafter termed a [position inquiry function]) subscribing a mobile telephone service thereof via the Internet 16.

The mobile telephone 31 corresponds to a terminal device according to the present invention, and a telephone 48 corresponds to another terminal device according to the present invention. The APs 45, 46, 47 correspond to control units according to the present invention, and the Web server 43 corresponds to a server according to the present invention.

Next, an operational example in the third embodiment will be described. A case in which the user who owns the mobile telephone 31 existing in Tokyo gives a call to the telephone 48 (its telephone number is 06-1111-4444) located in Osaka, will be explained by way of an operational example.

The employee, when dialing the phone number of the telephone 48, operates the mobile telephone 31 and transmits to the mobile telephone network 32 a piece of address information (URL) of the web server 43, of which the mobile telephone 31 has previously been notified. Executions of the following processes are triggered by this transmission process. Note that the same steps as those in the second embodiment are described with their contents simplified.

<Step S41> The mobile telephone 31 accesses the Web server 43.

<Step S42> The Web server 43 transmits the HTML file for displaying the log-in screen 17 (see FIG. 3) to the mobile telephone 31.

<Step S43> The mobile telephone 31, when receiving the HTML file, displays the log-in screen 16 based on a description of HTML file on the display. The user inputs a user's ID and PW unique to the user himself or herself on the log-in screen 17. The mobile telephone 31 transmits the inputted user's ID and PW to the Web server 43. The user's ID contains a telephone number of the mobile telephone 31.

Figure 11:
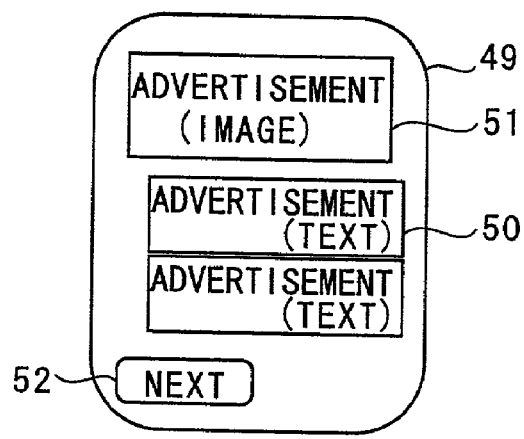
FIG. 11 is an explanatory diagram showing an advertisement screen.

<Step S44> The Web server 43 checks the received user's ID and PW and, if a result is "OK", transmits to the mobile telephone 31 the HTML file for displaying a screen (an advertisement screen: see FIG. 11) containing an advertisement that should be browsed by the user.

<Step S45> The mobile telephone 31, when receiving the HTML file, displays the advertisement screen 49 based on a description of this HTML file on the display. At this time, the mobile telephone 331 displays on the advertisement screen 49 a character string as an advertisement, of which the display is defined in the HTML file. Further, if image pasting to the advertisement screen 49 is defined in the HTML file, the mobile telephone 31 downloads a corresponding static image from the Web server 43 and pastes the static image to the advertisement screen 49. With this processing, an advertisement 50 expressed by a text and an advertisement 51 expressed by an image, are displayed on the advertisement screen 49. Note that the advertisement can be expressed by dynamic images and voices other than the static image, or may be presented by only one of these elements.

Figure 12:
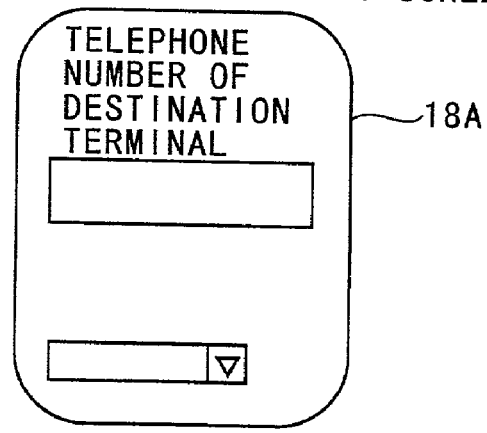
FIG. 12 is an explanatory diagram showing an input screen in the third embodiment.

<Step S45> The user browses the advertisements 50, 51 displayed on the advertisement screen 49 and thereafter, if the processing proceeds, presses a [Next] key or button 52 provided on the advertisement screen 49 of the mobile telephone 31. Then, the mobile telephone 31 transmits a request for an input screen 18A (see FIG. 12) for inputting the telephone number to the Web server 43. The input screen 18A unlike the input screen 18 does not implement the user interface for inputting the area information.

<Step S46> The Web server 43 transmits the input screen 18A (more specifically an HTML file for displaying this screen 18A) in response to the request given from the mobile telephone 31.

<Step S47> When the mobile telephone 31 displays the input screen 18A on the display, the user operates the mobile telephone 31 and inputs a telephone number of the destination terminal (the telephone number "06-1111-4444" of the telephone 48, which corresponds to first address information) on the input screen 18A.

<Step S48> the Web server 43, when receiving the telephone number "06-1111-4444" of the destination terminal, generates call identifying information (e.g., "12345678") unique to this phone number, and stores the telephone number and the call identifying information in the unillustrated storage unit provided in the Web server 43.

<Step S49> The Web server 43 extracts a telephone number of the mobile telephone 31 from the user ID received in step S44, and inquires of (the server of) a mobile telephone company 50 via the mobile telephone network 32 about a present location of the mobile telephone 31.

<Step S50> (The server of) the mobile telephone company 50 sends a piece of positional information such as "Tokyo Ohtemachi1" as a reply to the inquiry back to the Web server 43.

<Step S51> The Web server 43 obtains a telephone number (e.g., 0120-111-2222": corresponding to second address information) of the ISDN line corresponding to the AP 45 from the area information "Tokyo Ohtemachi 1" received from the mobile telephone company 50. Then, the Web server 43 transmits the HTML file for displaying the call originating screen 19 (see FIG. 5) to the mobile telephone 31. This HTML file contains the call identifying information "12345678" and the telephone number "012-111-2222".

<Step S52> The mobile telephone 31, upon receiving the HTML file, disconnects from the Web server 43, and displays the call originating screen 19 based on the received HTML file on the display. The HTML file is expressed by use of the same set of link tags as those in the second embodiment. The user is able to originate a call defined by the HTML link tags by the same operations as those in the second embodiment on the call originating screen 19. With this call originating, the mobile telephone 31 sends a message containing the called address "0120111222" and the sub called address "12345678" to the AP 45.

<Step S53> The call originated from the mobile telephone 31 arrives at the AP 45.

<Step S54> With this call arrived, the AP 45 receives the called sub address "12345678" contained in the message.

<Step S55> The AP 45 transmits the called sub address "12345678" to the Web server 43.

<Step S56> The Web server 43 judges whether the called sub address "12345678" is stored or not. If stored (in the case of "OK"), the Web server 43 transmits the telephone number "06-1111-4444" corresponding to "12345678" to the AP 45.

<Step S57> The AP 45, when receiving the telephone number "06-1111-4444" from the Web server 43, allows the call received from the mobile telephone 31 to arrive at the telephone number "06-1111-4444" (the telephone 48) from the AP 47 via the leased line.

<Step S58> With this call arrived, the telephone makes a ringing, and, when the user of the telephone 48 answers, the telephone 48 transmits a response signal to the AP 45 via the AP 47.

<Step S59> The AP 45, upon receiving the response signal, transmits the response signal to the ISDN line. The mobile telephone 31 and the telephone 48 are thereby brought into the call state through the APs 45, 47. This enables the user of the mobile telephone 31 to speak to the user of the telephone 48. The whole or some proportion of a charge occurred by this call is imposed on the SP.

The third embodiment discussed above has the following different points from the second embodiment.

The Web server 43 transmits, before sending the input screen 18A, the advertisement screen 49 to the mobile telephone 41. The SP is thereby capable of gaining the revenue of the advertisement fee from the sponsor.

The ISP (Internet Service Provider) obtains the area information by utilizing a positional information notifying service of the mobile-telephone company. It is therefore unnecessary for the user to input the area information, and hence the user-friendliness can be enhanced.

As the telephone numbers of the APs 45, 46, 47 are categorized as the called party charge telephone numbers, if these numbers leak out to users, there might be a possibility in which the SP is imposed to pay charges for invalid calls from those masquerade users. By contrast, according to the third embodiment, the mobile telephone 31 sends to the AP the message containing the called sub address embedded with the call identifying information. The AP, if the call identifying information received as the called sub address is not stored in the Web server 43, disconnects the call without transmitting the response signal to the mobile telephone 31. Therefore, the SP needs not to be burdened with the charge for the invalid call.

Further, the call identifying information is not given to the mobile telephone 31 unless the user logs in the Web server 43 and browses the advertisement. Hence, users who do not register their memberships of this discount service can neither utilize this discount service nor use the same service without browsing the advertisement.

Note that the mobile telephone 31 is assumed to be the cellular phone capable of browsing the content by accessing the Web server 33 (43) on the Internet 16 in the second and third embodiments. If the mobile telephone 31 is classified as a cellular phone implementing an E-mail delivering/receiving function, however, E-mail servers are installed in place of the Web servers 33, 43. In this case, the information is transferred and received simply by the E-mail between the mobile telephone 31 and the E-mail server, and the contents of the information transferred and received therebetween remain unchanged. The mobile telephone 31 may also be a PHS.

Fourth Embodiment

Each of the second and third embodiments discussed above is the exemplification of using the mobile telephone 31 (such as the cellular phone, the PHS etc) connectable to the Internet.

A fourth embodiment will exemplify a case where the present invention is applied to an Internet telephone.

A so-called Internet telephone structured to assemble voice data into IP packets and forward the IP packets on the Internet, has such an advantage that a charge for call is cheap and has a disadvantage in which a quality of speech is influenced by a traffic on the Internet. What can be considered to overcome this disadvantage may be a service wherein the SP prepares a communication line capable of keeping a high quality of voices and permits the users registered to utilize this communication line.

Figure 13:
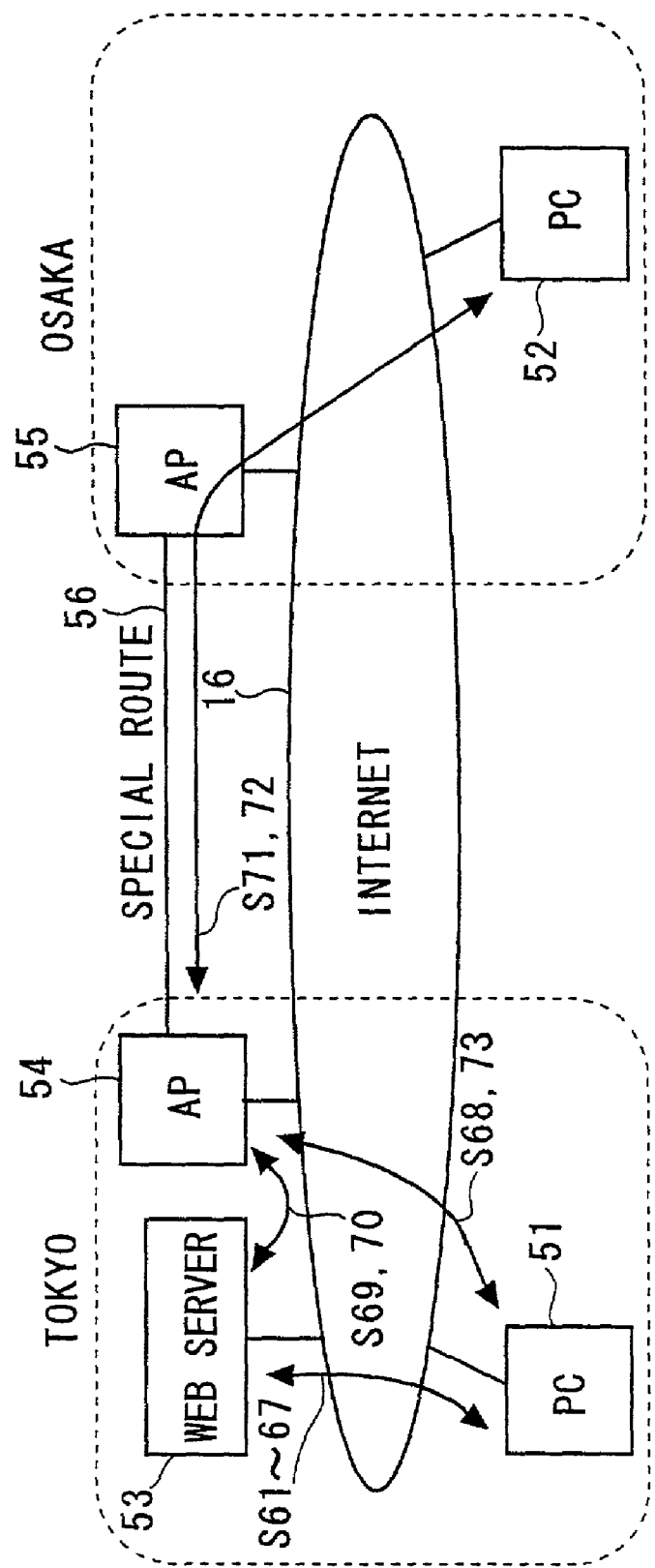
FIG. 13 is a diagram showing a system architecture in a fourth embodiment.

FIG. 13 is a diagram showing a system architecture in the fourth embodiment. Referring to FIG. 13, Internet telephony terminal devices 51, 52 are connected to the Internet 16. Each of the terminal devices 51, 52 is constructed of, e.g., a personal computer (PC). Each of the PCs implements IP telephony software (for making the PC function as the Internet telephony terminal) and a Web browser (categorized as software incorporating an Internet connection function and a function of browsing a Web page).

The SP installs a Web server 53 connected to the Internet 16 and installs access points (APs) 54, 55 to the Internet 16 in Tokyo and Osaka, respectively. The AP 54 and the AP 55 are connected to each other via a communication line (called a [special route]) 56 in which to ensure a predetermined quality of service (QoS).

The Internet telephony terminal device 51 corresponds to a terminal device according to the present invention, and the Internet telephony terminal device corresponds to another terminal device according to the present invention. The APs 54, 55 correspond to control units according to the present invention, and the Web server 53 corresponds to a server according to the present invention.

If the user of the terminal device 51 subscribes a discount service provided by the SP, steps of giving an Internet call to the Internet telephony terminal device 52 from the Internet telephony terminal device 51, are as follows:

<Step S61> The terminal device 51 accesses the Web server 53.

<Step S62> The Web server 53 transmits the log-in screen 17 (see FIG. 3) to the terminal device 51.

<Step S63> The user of the terminal device 51 inputs a user's own ID and PW on the log-in screen 17. The terminal device 51 transmits the user's ID and PW to the Web server 53.

Figure 14:
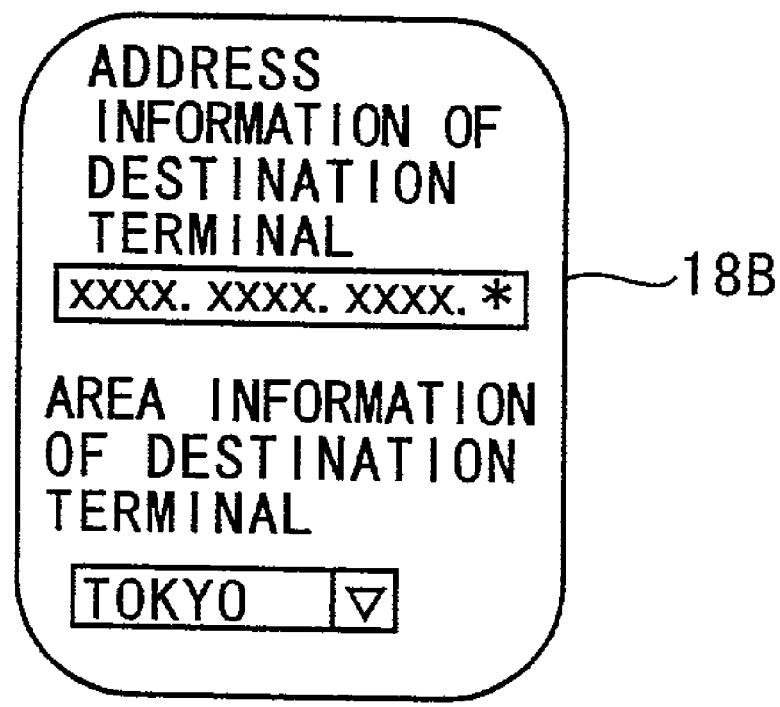
FIG. 14 is an explanatory diagram showing an input screen for address information and area information.
Figure 15:
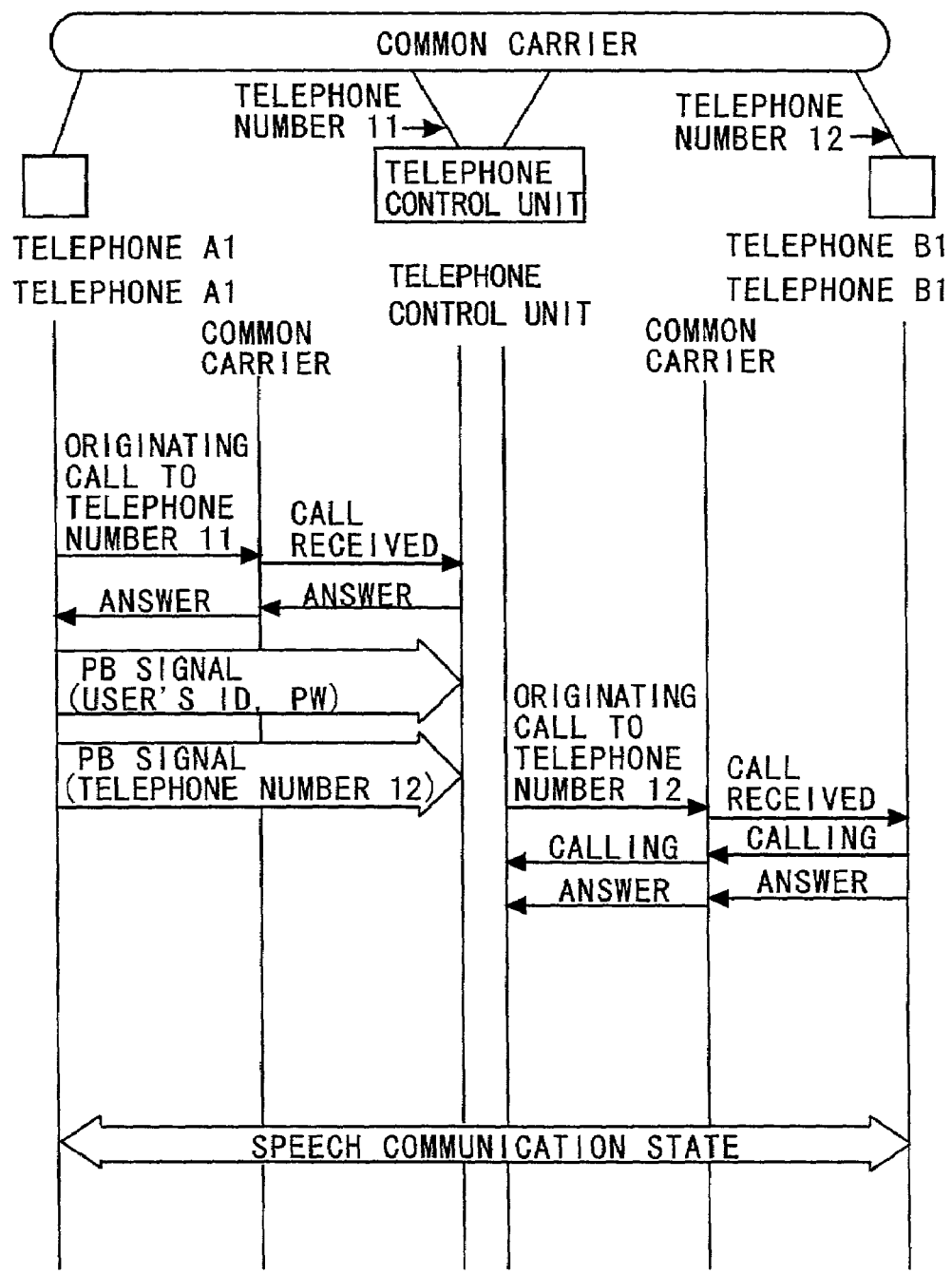
FIG. 15 is an explanatory diagram showing a first prior art.

<Step S64> The Web server 53 checks the received user's ID and PW and, if a result is "OK", transmits to the terminal device 51 an HTML file for displaying an input screen 18B (see FIG. 14) for address information. In the fourth embodiment, the address information indicates an IP address or a name or a telephone number showing a one-to-one correspondence to the IP address.

<Step S65> The terminal device 51, upon receiving the HTML file, displays the input screen 18B based on this HTML file on the display. The input screen 18B has an input area for inputting the address information of a destination terminal, and an input area for inputting area information indicating a location of the terminal device 51. The user operates the terminal device 51 and inputs the address information (corresponding to first address information) of the terminal device 52 and a piece of area information "Tokyo" on the input screen 18B. The terminal device 51 transmits the inputted address information and area information to the Web server 53.

<Step S66> The Web server 53, upon receiving the address information of the destination terminal, generates the call identifying information corresponding thereto, and stores these pieces information in the unillustrated storage device provided in the Web server 53.

<Step S67> The Web server 53 reads from the unillustrated storage device a piece of address information (corresponding to second address information) of the AP 54 that corresponds to the area information"Tokyo" received from the terminal device 51. Then, the Web server 53 transmits to the terminal device 51 the HTML file for displaying the call originating screen 19, which contains the address information and the call identifying information of the AP 54.

<Step S68> The mobile telephone 31, when receiving the HTML file, displays on the display the call originating screen 19 based on the HTML file received. The address information and the call identifying information are embedded in between the set of link tags of the HTML file. When the user clicks a button 20 displayed in the call originating screen 19, the IP telephony software is booted. The IP telephony software originates a call based on the address information of the AP 54. With this process, the terminal device 51 sends a message containing the call identifying information to the AP 54.

<Step S69> The AP 54, upon receiving the message, transmits the call identifying information contained in this message to the Web server 53.

<Step S70> The Web server 53 judges whether the call identifying information received from the AP 54 is stored or not, and, if stored (in the case of "OK") , transmits to the AP 54 the address information of the terminal device 52 corresponding to the call identifying information.

<Step S71> The AP 54, when receiving the address information of the terminal device 52 from the Web server 53 originates the call based on this piece of address information (accesses the terminal device 52) via the special route and the AP 55.

<Step S72> The AP 54, upon receiving a response signal, transmits the response signal to the terminal device 51. The call from the terminal device 51 is thereby received by the terminal device 52. With respect to this call, when the user of the terminal device 52 answers, the terminal device 52 transmits the response signal to the AP 54 via the AP 55 and the special route.

<Step S73> The AP 54, when receiving the response signal, transmits the response signal to the terminal device 51.

<Step S74> When the terminal device 51 receives the response signal, the terminal device 51 and the terminal device 52 become the call state via the APs 54, 55. This enables the user of the terminal device 51 to speak to the user of the terminal device 52.

According to the present invention, the terminal devices 51, 52 can establish the call each other via the special route provided by the SP and therefore can speak to each other with a higher quality of voices than the call via only the Internet 16.

Further, in the fourth embodiment also, the Web server 53 notifies the terminal device of the access point (AP) closest to the call originating terminal device (51 in the above example), and hence the charge needed for the communication from the terminal device to the AP can be restrained down to its minimum.

According to the first through third embodiments discussed above, the SP can restrain the call charge that should be imposed on the SP itself. Moreover, according to the fourth embodiment, the user is able to speak in the state where the predetermined QoS is ensured.

Furthermore, according to the first to fourth embodiments, the following remarkable effects can be obtained.

If the line of the call destination party is busy and there is no answer, the call is not charged a fee.

If the non-registered user accesses, the SP needs not to be burdened with the cal charge.

The optimum communication route (by which to minimize, e.g., the charge) is automatically selected depending on where the user is (the location of the mobile telephone).

The user of the service maybe only notified of the address information (e.g., the URL and the E-mail address) of the server beforehand.

The user is given a chance to browse the advertisement when the service is provided.

What is claimed is:

1. A speech communication service providing system comprising:

a server connected to the Internet; and a call control unit of speech communications, said server including:

(A) a module generating, when receiving a piece of first address information as a piece of address information of a destination of a speech communication from a terminal device, a piece of call identifying information corresponding to the first address information;

(B) a module storing the call identifying information and the first address information;

(C) a module notifying said terminal device of the call identifying information and second address information as a piece of address information of said control unit; and (D) a module notifying, when receiving the call identifying information from said control unit that is the same as call identifying information stored in said storing module, said control unit of the first address information corresponding thereto, said control unit including:

(a) a module inquiring, when receiving a call including the call identifying information transmitted from said terminal device using the second address information received from said server, said server about the first address information corresponding to the call identifying information included in the call; and (b) a module performing, when receiving the corresponding first address from said server, processes in order that the call from said terminal device arrives at another terminal device corresponding to the first address information.

2. A speech communication service providing system comprising:

a server connected to the Internet; and a plurality of call control units of speech communications, said server including:

(A) a module generating, when receiving a piece of first address information as a piece of address information of a call destination of a speech communication from a terminal device, a piece of call identifying information corresponding to the first address information;

(B) a module storing the call identifying information and the first address information;

(C) a module obtaining second address information as a piece of address information of said control unit corresponding to positional information of said terminal device among said plurality of control units;

(D) a module notifying said terminal device of die call identifying information and second address information; and (B) a module notifying, when receiving the call identifying information from said control unit that is the same as call identifying information stored in said storing module, said control unit of the first address information corresponding thereto, said control unit including:

(a) a module inquiring, when receiving a call including the call identifying information transmitted from said terminal device using the second address information received from said server, said server about the first address information corresponding to the call identifying information included in the call; and (b) a module performing, when receiving the corresponding first address from said server, processes in order that the call from said terminal device arrives at another terminal device corresponding to the first address information.

3. A speech communication service providing system according to claim 2, wherein said server receives the positional information of said terminal device from said terminal device.

4. A speech communication service providing system according to claim 2, wherein said server obtains the positional information of said terminal device by inquiring a service enterprise for providing the speech communication service for said terminal device about the positional information of said terminal device.

5. A speech communication service providing system according to claim 1, wherein said control unit transmits, only when receiving a response signal from said another terminal device receiving the call from said terminal device, a response signal, which corresponds to the call from said terminal device, to said terminal device.

6. A speech communication service providing system according to claim 1, wherein said terminal device is a mobile telephone having an Internet connecting function.

7. A speech communication service providing system according to claim 1, wherein said terminal device and said another terminal device are computers having the Internet connecting function and an Internet telephony function, and said control unit is an access point to the Internet.

8. A speech communication service providing system according to claim 1, wherein the second address information is a piece of called party charge address information, and an installer of said control unit is burdened with a part or the whole of a charge for the speech communication between said terminal device and said another terminal device.

9. A speech communication service providing system according to claim 1, wherein said server gives said terminal device the call identifying information and the second address information in a way that is visually unrecognizable by a user of said terminal device, and said control unit receives the call transmitted based on an instruction inputted in a state where the user of said terminal device does not know the call identifying information and the second address information.

10. A speech communication service providing system according to claim 1, wherein said server gives advertisement information to said terminal device and notifies said terminal device of the call identifying information and the second address information on condition that a user of said terminal device is to browse the advertisement information.

11. A speech communication service providing system according to claim 1, wherein said server transmits a request for user authentication information to said terminal device and, only when the user authentication information received from said terminal device is valid, notifies said terminal device of the call identifying information and the second address information.

12. A speech communication service providing system according to claim 2, wherein address information of a control unit closest to a position of said terminal device is obtained as the second address information corresponding to the positional information of said terminal device.

13. A speech communication service providing system according to claim 12, wherein said plurality of control units are connected to each other via a relay line, and when said control unit closest to the position of said terminal device is different from a control unit closest to said another terminal device, said control unit corresponding to the second address information performs processes in order that the call from said terminal device arrives at said another terminal device via the relay line of said control unit closest to said another terminal device.

14. A speech communication service providing system comprising:

a server connected to the Internet; and first and second access points to the Internet, said first and second access points being connected via a special route where a predetermined quality of communications is ensured, first and second terminal devices each having an Internet connecting module and an Internet telephony module and being connected respectively to said first and second access points, said server including:

(A) a generating module generating, when receiving a piece of first address information as a piece of address information of said second terminal device from said first terminal device, call identifying information corresponding to the first address information;

(B) a module storing the call identifying information and the first address information;

(C) a module notifying said first terminal device of the call identifying information and second address information as a piece of address information of said first access point; and (D) a module notifying, when receiving the call identifying information from said first access point that is the same as call identifying information stored in said storing module, said first access point of the first address information corresponding thereto, said first access point including:

(a) a module inquiring, when receiving a call including the call identifying information transmitted from said first terminal device using the second address information received from said server, said server about the first address information corresponding to the call identifying information contained in this call; and (b) a module performing, when receiving the corresponding first address information from said server, processes in order that the call from said first terminal device arrives at said second terminal device corresponding to the first address information via the special route and said second access point.

15. A call service providing system according to claim 8, wherein said control unit is installed by an enterprise, and said terminal device is a mobile telephone individually owned by an employee.

16. A speech communication service providing system according to claim 2, wherein said control unit transmits, only when receiving a response signal from said another terminal device receiving the call from said terminal device, a response signal, which corresponds to the call from said terminal device, to said terminal device.

17. A speech communication service providing system according to claim 2, wherein said terminal device is a mobile telephone having an Internet connecting function.

18. A speech communication service providing system according to claim 2, wherein said terminal device and said another terminal device are computers having the Internet connecting function and an Internet telephony function, and said control unit is an access point to the Internet.

19. A speech communication service providing system according to claim 2, wherein the second address information is a piece of called party charge address information, and an installer of said control unit is burdened with a part or the whole of a charge for the speech communication between said terminal device and said another terminal device.

20. A speech communication service providing system according to claim 2, wherein said server gives said terminal device the call identifying information and the second address information in a way that is visually unrecognizable by a user of said terminal device, and said control unit receives the call transmitted based on an instruction inputted in a state where the user of said terminal device does not know the call identifying information and the second address information.

21. A speech communication service providing system according to claim 2, wherein said server gives advertisement information to said terminal device and notifies said terminal device of the call identifying information and the second address information on condition that a user of said terminal device is to browse the advertisement information.

22. A speech communication service providing system according to claim 2, wherein said server transmits a request for user authentication information to said terminal device and, only when the user authentication information received from said terminal device is valid, notifies said terminal device of the call identifying information and the second address information.

* * * * *

UNITED STATES PATENT AND TRADEMARK OFFICE
CERTIFICATE OF CORRECTION

PATENT NO. : 7,155,520 B2
APPLICATION NO. : 09/918280
DATED : December 26, 2006
INVENTOR(S) : Takashi Matsumoto Page 1 of 1

It is certified that error appears in the above-identified patent and that said Letters Patent is hereby corrected as shown below:

(1) Claim 2, column 22, line 65: "...device of die call..."
should be indicated as --...device of the call...--

(2) Claim 2, column 23, line 1: "(B) a module notifying..."
should be indicated as --(E) a module notifying...--

Signed and Sealed this

Thirtieth Day of September, 2008

JON W. DUDAS
*Director of the United States Patent and Trademark Office*